United States Patent
Tiwari et al.

(10) Patent No.: US 11,297,680 B2
(45) Date of Patent: Apr. 5, 2022

(54) METHOD AND APPARATUS FOR HANDLING EMERGENCY SERVICES IN A WIRELESS NETWORK

(71) Applicant: Samsung Electronics Co., Ltd., Suwon-si (KR)

(72) Inventors: Kundan Tiwari, Bangalore (IN); Lalith Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/903,092

(22) Filed: Jun. 16, 2020

(65) Prior Publication Data

US 2020/0396792 A1 Dec. 17, 2020

(30) Foreign Application Priority Data

Jun. 17, 2019 (IN) .............................. 201941024005
Jun. 8, 2020 (IN) .............................. 201941024005

(51) Int. Cl.
| | |
|---|---|
| H04W 76/50 | (2018.01) |
| H04W 36/08 | (2009.01) |
| H04W 36/00 | (2009.01) |
| H04W 48/10 | (2009.01) |
| H04W 84/04 | (2009.01) |

(52) U.S. Cl.
CPC ....... H04W 76/50 (2018.02); H04W 36/0085 (2018.08); H04W 36/08 (2013.01); H04W 48/10 (2013.01); H04W 84/045 (2013.01)

(58) Field of Classification Search
CPC ..................................................... H04W 76/50
See application file for complete search history.

(56) References Cited

U.S. PATENT DOCUMENTS

| | | | |
|---|---|---|---|
| 9,554,317 B2* | 1/2017 | Faccin .................. | H04W 36/24 |
| 10,791,540 B2 | 9/2020 | Byun et al. | |
| 2009/0262684 A1* | 10/2009 | Khetawat .............. | H04L 63/104 |
| | | | 370/328 |
| 2010/0157943 A1* | 6/2010 | Horn .................. | H04W 36/0005 |
| | | | 370/331 |
| 2019/0116486 A1 | 4/2019 | Kim et al. | |
| 2020/0351755 A1* | 11/2020 | Huang-Fu ............. | H04W 8/186 |

(Continued)

OTHER PUBLICATIONS

International Search Report and Written Opinion of the International Searching Authority in connection with International Application No. PCT/KR2020/007843 dated Sep. 25, 2020, 10 pages.

(Continued)

*Primary Examiner* — Qutbuddin Ghulamali

(57) ABSTRACT

Methods and systems for handling emergency services in a wireless network. A method disclosed herein includes enabling at least one User Equipment (UE) supporting only Closed Access Group (CAG) cell/non-public network (NPN) to camp onto at least one non-CAG cell/public network cell to access the emergency services. The method further includes enabling the at least one UE to switch behavior of a timer from a periodic registration timer with a "Strictly Periodic Registration Timer Indication" to a normal periodic registration timer/pre-release 16 behavior for performing the emergency services.

20 Claims, 24 Drawing Sheets

(56) References Cited

U.S. PATENT DOCUMENTS

2021/0160680 A1 5/2021 Velev et al.
2021/0219355 A1 7/2021 Lindheimer et al.

OTHER PUBLICATIONS

China Mobile, "Emergency services for CAG cell," S2-1903693, 3GPP TSG-SA2 Meeting #132, Xi'an, China, Apr. 8-12, 2019, 3 pages.
Huawei, et al., "Resolution of editor's notes on handling at emergency registration and emergency PDU sessions," C1-192366, 3GPP TSG-CT WG1 Meeting #116, Xian, P.R. of China, Apr. 8-12, 2019, 5 pages.
Samsung, "Emergency call handling for a CAG only UE," C1-194787, rev of C1-194520, 3GPP TSG-CT WG1 Meeting #119, Wroclaw (Poland), Aug. 26-30, 2019, 3 pages.
Notice of Allowance dated Jul. 22, 2021 in connection with U.S. Appl. No. 16/904,459, 9 pages.

\* cited by examiner

METHOD AND APPARATUS FOR HANDLING EMERGENCY SERVICES IN A WIRELESS NETWORK

CROSS-REFERENCE TO RELATED APPLICATIONS

This application is based on and claims priority under 35 U.S.C. § 119(a) to Indian Provisional Application No. 201941024005 filed on Jun. 17, 2019, and Indian complete Application No. 201941024005 filed on Jun. 8, 2020 in the Indian Patent Office, the disclosures of which are herein incorporated by reference in their entirety.

BACKGROUND

1. Field

The present disclosure relates to the field of wireless networks and more particularly to handling emergency services in a wireless network.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human-centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

Accordingly, an aspect of the disclosure is to provide methods and systems for handling emergency services in a wireless network. A method disclosed herein includes initiating at least one emergency service while operating in a Closed Access Group (CAG) only mode. The method further includes selecting a non-CAG cell from a plurality of non-CAG cells in a Public Land Mobile Network (PLMN). The method further includes performing the initiated at least one emergency service by camping onto the selected non-CAG cell.

In an embodiment of the disclosure, wherein the wireless network includes at least one Non-Public Network (NPN) connected to the PLMN, wherein the at least one NPN is at least one CAG cell.

In an embodiment of the disclosure, wherein in the CAG only mode, the UE connects only to the at least one CAG cell to access the PLMN, wherein the at least one CAG cell provides at least one private service to the UE.

In an embodiment of the disclosure, wherein each of the plurality of non-CAG cells is a public Radio Access Network (RAN) connected to at least one Core Network (CN) of at least one Radio Access Technology (RAT) present in the PLMN.

In an embodiment of the disclosure, wherein each non-CAG cell supports the at least one CAG cell and provides at least one normal communication service and the at least one emergency service to the UE.

In an embodiment of the disclosure, wherein selecting, by the UE, the non-CAG cell includes: disabling the CAG only mode; determining the plurality of non-CAG cells available in a location of the UE based on at least one signal broadcasted by the plurality of non-CAG cells; and selecting the non-CAG cell from the plurality of non-CAG cells based on at least one factor associated with the at least one signal broadcasted by the plurality of non-CAG cells, wherein the at least one factor includes at least one of signal strength, and reference signal receive power. In an embodiment of the disclosure, wherein the UE selects the non-CAG cell for the initiated at least one emergency service when the UE does not determine the at least one CAG cell in the location, or when the at least one CAG cell connected to the UE does not support the initiated at least one emergency service.

In an embodiment of the disclosure, wherein performing, by the UE, the initiated at least one emergency service includes: camping on to the selected non-CAG cell and establishing a Radio Resource Control (RRC) connection with the selected non-CAG cell, wherein the non-CAG cell connects the UE to the associated at least one CN; establishing an emergency Protocol Data Unit (PDU) session with an external data network through the at least one CN by performing an emergency attach procedure with the at least one CN through the selected non-CAG cell; and performing the initiated at least one emergency service over the established emergency PDU session.

In an embodiment of the disclosure, the method further comprises: entering, by the UE, into an idle mode on completing the initiated emergency service; remaining, by the UE, in the idle mode for a pre-defined period of time; and enabling, by the UE, the CAG only mode on an expiry of the pre-defined period of time.

In an embodiment of the disclosure, wherein the UE enables the CAG only mode by performing a registration update procedure with the at least one CN of the PLMN.

In an embodiment of the disclosure, the method further comprising: establishing, by the UE, the emergency PDU session with the at least one CAG cell for performing the initiated at least one emergency service, when the UE is camped on the at least one CAG cell during the CAG only mode; determining, by the UE, a connection loss with the camped at least one CAG cell, while performing the at least one emergency service through the camped at least one CAG cell; and selecting, by the UE, the non-CAG cell for completing the at least one emergency service on determining the connection loss with the camped at least one CAG cell.

Accordingly, an aspect of the disclosure is to provide a User Equipment (UE) for managing emergency services in a wireless network, wherein the UE includes a memory and a controller. The controller is configured to initiate at least one emergency service, while the UE is operating in a Closed Access Group (CAG) only mode. The controller is further configured to select a non-CAG cell from a plurality of non-CAG cells in a Public Land Mobile Network (PLMN). The controller is further configured to perform the initiated at least one emergency service by enabling the UE to camp onto the selected non-CAG cell.

In an embodiment of the disclosure, wherein the wireless network includes at least one Non-Public Network (NPN) connected to the PLMN, wherein the at least one NPN is at least one CAG cell.

In an embodiment of the disclosure, wherein in the CAG only mode, the UE connects only to the at least one CAG cell to access the PLMN, wherein the at least one CAG cell provides at least one private service to the UE.

In an embodiment of the disclosure, wherein each of the plurality of non-CAG cells is a public Radio Access Network (RAN) connected to at least one Core Network (CN) of at least one Radio Access Technology (RAT) present in the PLMN.

In an embodiment of the disclosure, wherein each non-CAG cell supports the at least one CAG cell and provides at least one normal communication service and the at least one emergency service to the UE.

In an embodiment of the disclosure, wherein the controller is further configured to: disable the CAG only mode; determine the plurality of non-CAG cells available in a location of the UE based on at least one signal broadcasted by the plurality of non-CAG cells; and select the non-CAG cell from the plurality of non-CAG cells based on at least one factor associated with the at least one signal broadcasted by the plurality of non-CAG cells, wherein the at least one factor includes at least one of signal strength, and reference signal receive power.

In an embodiment of the disclosure, wherein the controller is further configured to: select the non-CAG cell for the initiated at least one emergency service when the UE does not determine the at least one CAG cell in the location, or when the at least one CAG cell connected to the UE does not support the initiated at least one emergency service.

In an embodiment of the disclosure, wherein the controller is further configured to: enable the UE to camp on to the selected non-CAG cell and to establish a Radio Resource Control (RRC) connection with the selected non-CAG cell, wherein the non-CAG cell connects the UE to the associated at least one CN; enable the UE to establish an emergency Protocol Data Unit (PDU) session with an external data network through the at least one CN by performing an emergency attach procedure with the at least one CN through the selected non-CAG cell; and perform the initiated at least one emergency service over the established emergency PDU session.

In an embodiment of the disclosure, wherein the controller is further configured to: enable the UE to enter into an idle mode on completing the initiated emergency service; enable the UE to remain in the idle mode for a pre-defined period of time; and enable the CAG only mode on an expiry of the pre-defined period of time.

In an embodiment of the disclosure, wherein the controller is further configured to enable the CAG only mode by enabling the UE to perform a registration update procedure with the at least one CN of the PLMN.

In an embodiment of the disclosure, wherein the controller is further configured to: enable the UE to establish the emergency PDU session with the at least one CAG cell for performing the initiated at least one emergency service, when the UE is camped on the at least one CAG cell during the CAG only mode; determine a connection loss with the camped at least one CAG cell, while performing the at least one emergency service through the camped at least one CAG cell; and select the non-CAG cell for completing the at least one emergency service on determining the connection loss with the camped at least one CAG cell.

Accordingly, an aspect of the disclosure is to provide a wireless network system comprising: a Public Land Mobile Network (PLMN) including a plurality of non-Closed Access Group (CAG) cells and at least one Core Network (CN) of at least one Radio Access Technology (RAT); at least one CAG cell coupled to the PLMN, wherein the at least one CAG cell is at least one Non-Public Network (NPN); and a plurality of User Equipments (UEs) supporting the at least one CAG cell and the PLMN, wherein a UE of the plurality of UEs is configured to: initiate at least one emergency service while operating in a CAG only mode; select the non-CAG cell from the plurality of non-CAG cells in the PLMN; and perform the initiated at least one emergency service by camping onto the selected non-CAG cell.

In an embodiment of the disclosure, wherein the UE connects only to the at least one CAG cell to access the PLMN in the CAG only mode.

In an embodiment of the disclosure, wherein each non-CAG cell supports the at least one CAG cell and provides at least one normal communication service and the at least one emergency service to the UE.

In an embodiment of the disclosure, wherein the UE is further configured to: disable the CAG only mode; determine the plurality of non-CAG cells available in a location of the UE based on at least one signal broadcasted by the plurality of non-CAG cells; and select the non-CAG cell from the plurality of non-CAG cells based on at least one factor associated with the at least one signal broadcasted by the plurality of non-CAG cells, wherein the at least one factor includes at least one of signal strength, and reference signal receive power.

In an embodiment of the disclosure, wherein the UE is further configured to: camp on to the selected non-CAG cell and to establish a Radio Resource Control (RRC) connection with the selected non-CAG cell, wherein the non-CAG cell connects the UE to the associated at least one CN; establish an emergency Protocol Data Unit (PDU) session with an external data network through the at least one CN by performing an emergency attach procedure with the at least one CN through the selected non-CAG cell; and perform the initiated at least one emergency service over the established emergency PDU session.

In an embodiment of the disclosure, wherein the at least one CN is configured to perform a handover of the UE from the at least one CAG cell to the non-CAG cell for completing the at least one emergency service, when the UE loses connection with the at least one CAG cell while performing the at least one emergency service through the at least one CAG cell.

According to an embodiment of the disclosure, an aspect of the disclosure is to provide methods and systems for handling emergency services in a wireless network. The method comprising: receiving, by a User Equipment (UE), a periodic registration timer value with a "Strictly Periodic Registration Timer Indication" indication from a Core Network (CN); operating, by the UE, a timer in a strictly periodic registration mode in response to the received periodic registration timer value with the "Strictly Periodic Registration Timer Indication" indication; initiating, by the UE, at least one emergency service while the timer is operating; switching, by the UE, behavior of the timer from the strictly periodic registration mode to a normal periodic registration mode on initiating the at least one emergency service; and performing, by the UE, the initiated at least one emergency service on the behavior of the timer being switched.

In an embodiment of the disclosure, wherein in the strictly periodic registration mode, the UE continues to operate the timer with the periodic registration timer value, when the UE moves from an idle mode to a connected mode, and when the UE moves from the connected mode to the idle mode.

In an embodiment of the disclosure, wherein in the normal periodic registration mode, the UE terminates the timer, when the UE moves from the idle mode to the connected mode.

In an embodiment of the disclosure, wherein in the normal periodic registration mode, the UE resets and restarts the timer, when the UE moves from the connected mode to the idle mode.

In an embodiment of the disclosure, a User Equipment (UE) in a wireless network comprising: a memory; and a periodic registration controller coupled to the memory configured to: receive a periodic registration timer value with a "Strictly Periodic Registration Timer Indication" indication from a Core Network (CN); operate a timer in a strictly periodic registration mode in response to the received periodic registration timer value with the "Strictly Periodic Registration Timer Indication" indication; initiate at least one emergency service while the timer is operating; switch behavior of the timer from the strictly periodic registration mode to a normal periodic registration mode on initiating the at least one emergency service; and perform the initiated at least one emergency service on the behavior of the timer being switched.

In an embodiment of the disclosure, wherein in the strictly periodic registration mode, the UE continues to operate the timer with the periodic registration timer value, when the UE moves from an idle mode to a connected mode, and when the UE moves from the connected mode to the idle mode.

In an embodiment of the disclosure, wherein in the normal periodic registration mode, the UE terminates the timer, when the UE moves from the idle mode to the connected mode.

In an embodiment of the disclosure, wherein in the normal periodic registration mode, the UE resets and restarts the timer, when the UE moves from the connected mode to the idle mode.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Before undertaking the detailed description below, it may be advantageous to set forth definitions of certain words and phrases used throughout this patent document the terms "include" and "comprise," as well as derivatives thereof, mean inclusion without limitation, the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like, and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1A:
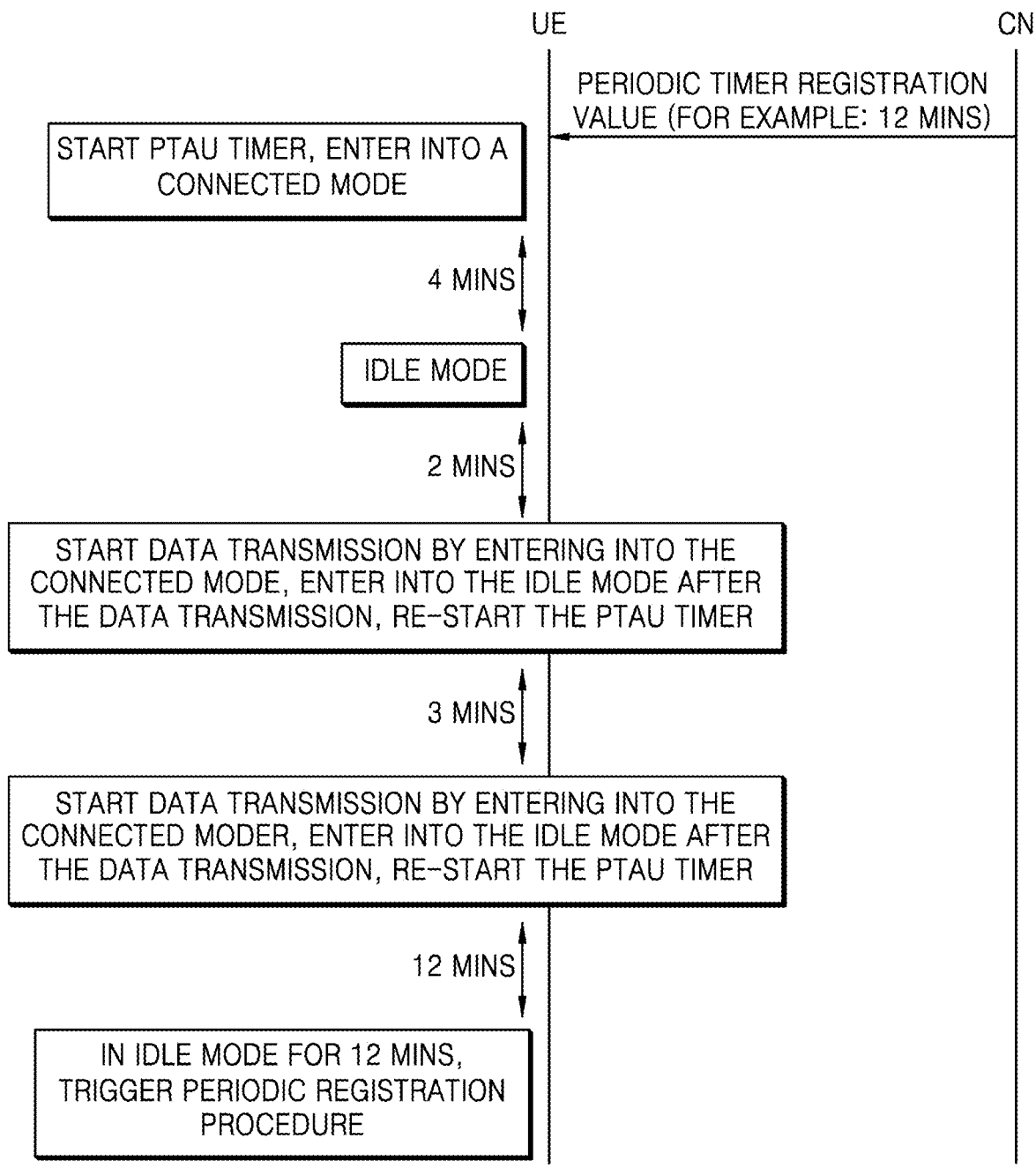
FIGS. 1A-1D depict are sequence diagrams depicting conventional methods of handling emergency services while performing a periodic registration procedure using a periodic registration timer and a periodic registration timer with "Strictly Periodic Registration Timer Indication"

FIGS. 1A through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments herein disclose methods and systems for handling emergency services in a wireless network.

Embodiments herein enable at least one User Equipment (UE) supporting only Closed Access Group (CAG) cell/non-public network (NPN) to connect to at least one non-CAG cell/public cell of at least one public network for accessing the emergency services.

Embodiments herein enable the at least one UE to switch behavior of a timer from a periodic registration procedure with a "Strictly Periodic Registration Timer Indication" to a periodic registration procedure/16 pre-release behavior for accessing the emergency services, while performing the periodic registration procedure.

The principal object of the embodiments herein is to disclose methods and systems for handling emergency services in a wireless network.

Another object of the embodiments herein is to disclose methods and systems for enabling at least one User Equipment (UE) supporting only Closed Access Group (CAG) cell/non-public network (NPN) to access the emergency services by camping onto at least one non-CAG cell/public network cell.

Another object of the embodiments herein is to disclose methods and systems for enabling the at least one UE to handle the emergency services, while performing a periodic registration procedure with a timer, wherein the timer behaves a periodic registration timer with a "Strictly Periodic Registration Timer Indication".

Another object of the embodiments herein is to disclose methods and systems for enabling the at least one UE to switch behavior of the timer from the periodic registration timer with the "Strictly Periodic Registration Timer Indication" to a normal periodic registration timer/pre-release 16 behavior for performing the emergency services.

Referring now to the drawings, and more particularly to FIGS. 1A-1D, 2A-2C, 3, 4A-4B, 5-7, 8A-8B, 9A-9B, 10-11, 12A-12C, 13 to 14, where similar reference characters denote corresponding features consistently throughout the figures, there are shown example embodiments.

FIGS. 1A-1D depict are sequence diagrams depicting conventional methods of handling emergency services while performing a periodic registration procedure using a periodic registration timer and a periodic registration timer with "Strictly Periodic Registration Timer Indication".

According to 3rd Generation Partnership Project (3GPP) TS 24.501 and 3GPP TS 23.122, the UE can support only private network/non-public networks (NPN). The NPNs may be deployed by enterprises to meet and optimize coverage, performance, and security requirements of their business processes. The NPN may use Closed Access Group (CAG) and/or a non-public network identifier to identify a group of subscribers/UEs, who are permitted to use the one or more NPNs (can be referred hereinafter as CAG cell).

When the UE supports only the NPN/CAG cell, the UE can connect to only the CAG cell to access public networks (of any Radio Access Technologies (RAT)) for normal services or emergency services. However, coverage of the CAG cell is very limited; therefore the UE, supporting only the CAG cell, can perform the emergency services only in a limited coverage. Further, when the UE initiates an emergency service/call and the at least one CAG cell is not available or the at least one available CAG cell does not support the emergency services, the UE may not able to complete the initiated emergency service. Also, the UE may not able to select any non-CAG cells of any RATs available at a location for performing the emergency service, as the UE supports only the CAG cell. Thus, in conventional approaches, the UE supporting only CAG cell/NPN may not able to perform the emergency services on the non-CAG cells.

According to 3GPP TS 24.501, the UE may perform a periodic registration procedure with at least one Core Network (CN) of any RAT to register the location information and update the mobile registration with the CN. The UE may use a periodic registration timer or a periodic registration timer with "Strictly Periodic Registration Timer Indication" for performing the periodic registration procedure.

Consider an example scenario as depicted in FIG. 1A, wherein the UE performs the periodic registration procedure using the periodic registration timer. The UE sends a periodic registration request to the CN and receives a periodic registration timer value of 12 minutes (for example) from the CN. The periodic registration timer value indicates the time value at which the UE has to perform the periodic registration procedure with the CN. On receiving the periodic registration timer value, the UE starts executing/operating a periodic tracking area update (PTAU) timer by applying the received periodic registration timer value (for example: 12 mins). In an example, the PTAU timer behaves as the periodic registration timer.

In an example herein, on starting the PTAU timer, the UE may operate in the connected mode for 4 minutes. After 4 minutes, the UE may enter into the idle mode. After 2 minutes, the UE exits from the idle mode and starts data transmission by entering into the connected mode and enters into the idle mode on completion of the data transmission. When the UE enters into the idle mode, the UE restarts the PTAU timer. Thus, the PTAU timer starts from a value of 0 again. Further, the UE may start the data transmission by entering into the connected mode after 3 minutes of restarting the PTAU timer. On completion of the data transmission, the UE enters into the idle mode and again restarts the PTAU timer. The UE may remain in the idle mode till the expiry of the PTAU timer and may start performing the periodic registration procedure. In an example herein, the UE may remain in the idle mode for 12 minutes, as the PTAU timer expires on reaching the value of 12 minutes and may start performing the periodic registration procedure after 12 minutes. Thus, in the conventional approaches, the UE has to restart the periodic registration timer, whenever the data transmission occurs.

Figure 1B:
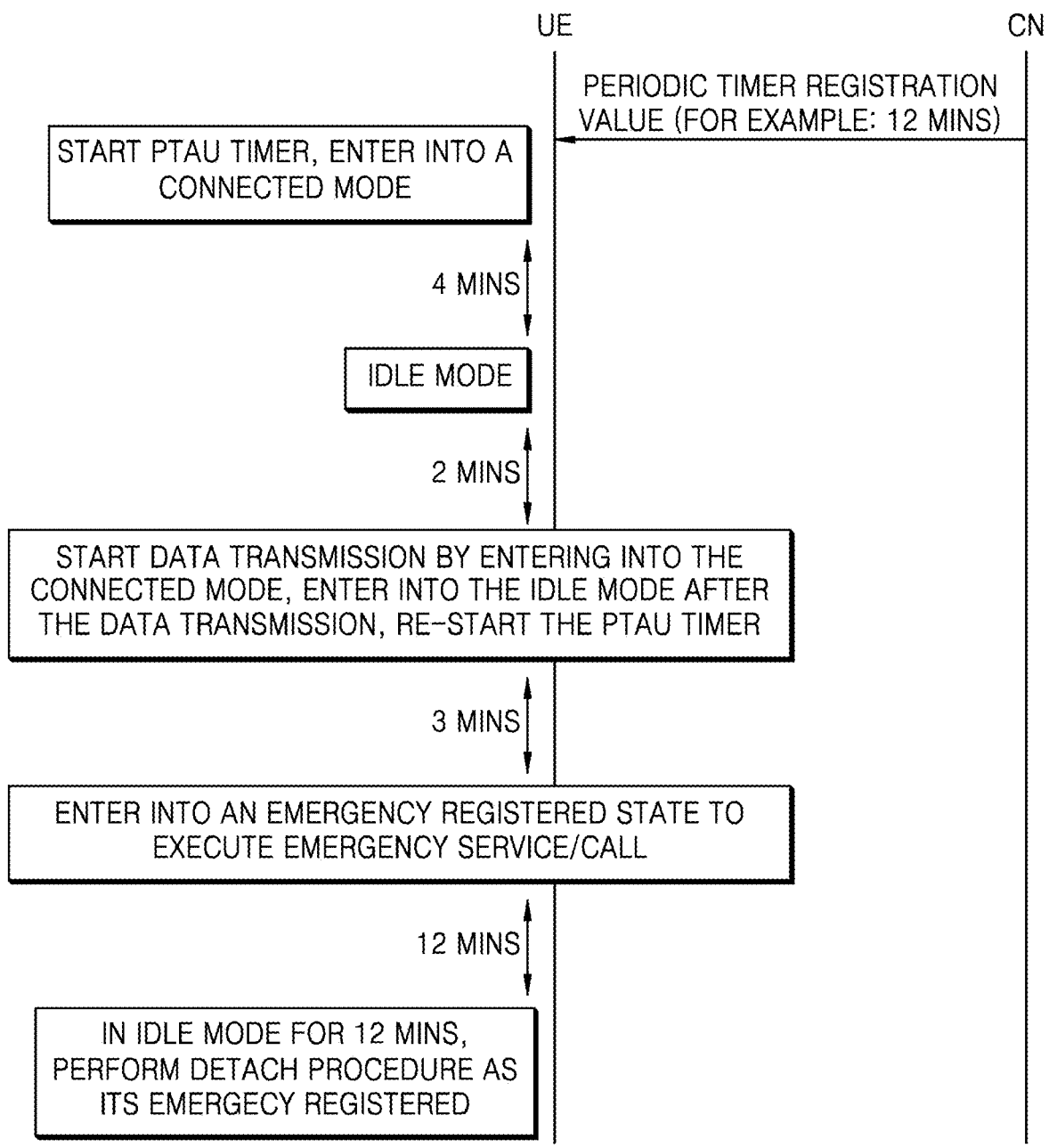

Consider another example scenario as depicted in FIG. 1B, wherein the UE performs the periodic registration procedure using the periodic registration timer and initiates the emergency service while the periodic registration time is operating. The UE sends a periodic registration request to the CN and receives a periodic registration timer value of 12 minutes (for example) from the CN. On receiving the periodic registration timer value, the UE starts the PTAU timer by applying the received periodic registration timer value (for example: 12 mins), and the PTAU timer behaves as the periodic registration timer.

In an example herein, on starting the PTAU timer, the UE may operate in the connected mode for 4 minutes. After 4 minutes, the UE may enter into the idle mode. After 2 minutes, the UE exits from the idle mode and starts data transmission by entering into the connected mode and enters into the idle mode on completion of the data transmission. When the UE enters into the idle mode, the UE restarts the PTAU timer. Thus, the PTAU timer starts from a value of 0 again. After 3 minutes of restarting the periodic registration timer, the UE may initiate/execute the emergency service by entering into an emergency registered state. Only on the completion of the emergency service, the UE enters into the idle mode. When the UE enters into the idle mode, the UE restarts the PTAU timer. The UE may remain in the idle mode till the expiry of the PTAU timer and will perform detach procedure on expiry of PTAU timer. In an example herein, the UE may remain in the idle mode for 12 minutes, as the PTAU timer expires by reaching the value of 12 minutes. Within 12 minutes of time, the UE may receive the response/call back from the CN in response to the executed emergency service. Further, the UE performs a detach procedure to exit from the emergency state on the expiry of the PTAU timer. Thus for normal periodic timer the UE gets full 12 mins (PTAU timer value duration) to remain registered with the network to receive any possible emergency call back from the network.

Figure 1C:
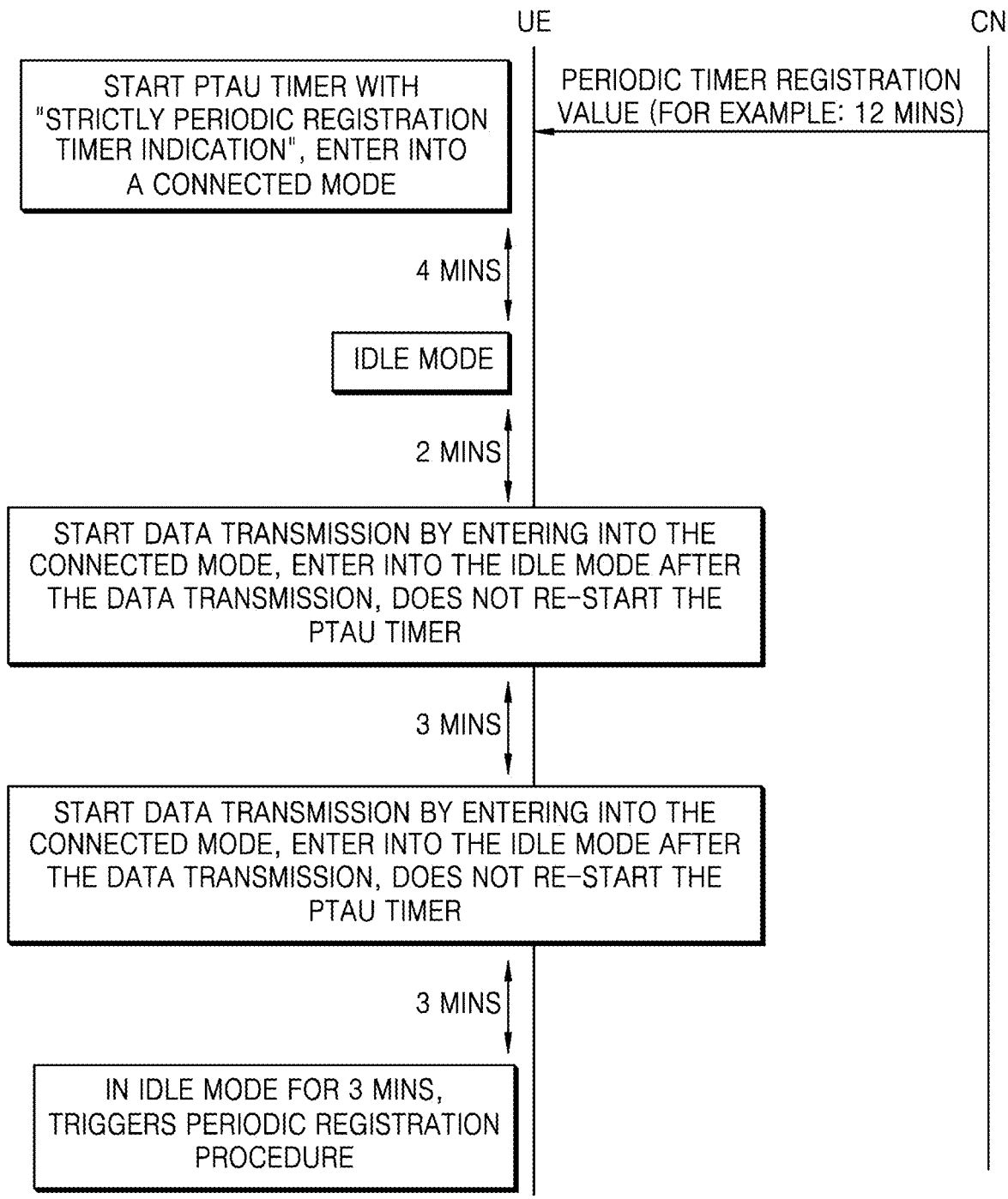

Consider an example scenario as depicted in FIG. 1C, wherein the UE performs the periodic registration procedure using the periodic registration timer with the "Strictly Periodic Registration Timer Indication". The UE sends a periodic registration request to the CN and receives a periodic registration timer value of 12 minutes (for example) from the CN. The periodic registration timer value indicates time value at which the UE has to perform the periodic registration procedure with the CN. On receiving the periodic registration timer value, the UE starts executing/operating the PTAU timer by applying the received periodic registration timer value (for example: 12 mins) with the "Strictly Periodic Registration Time Indication". In an example, the PTAU behaves as the periodic registration timer with the "Strictly Periodic Registration Time Indication", wherein the "Strictly Periodic Registration Time Indication" indicates that the PTAU timer does not require to re-start if the UE enters into the connected mode or the idle mode during the received periodic registration timer value (i.e. while the PTAU timer is operating).

In an example, on starting the PTAU timer, the UE remains in the connected mode for 4 minutes and enter into the idle mode. After 2 minutes of entering into the idle mode, the UE starts the data transmission by entering into the connected mode. The UE may enter into the idle mode on completion of the data transmission. The UE may continue the periodic registration timer without restating it when the UE enters into the idle mode. Further, after 3 minutes of entering into the idle mode, the UE starts the data transmission by entering into the connected mode. The UE may enter into the idle mode on completion of the data transmission and remain in the idle mode till the expiry of the PTAU timer. In an example scenario, the UE may remain in the idle mode for 3 minutes, as the periodic registration timer expires after 3 minutes of the UE entering into the idle mode (that is after 12 minutes of initiating the periodic registration timer). The expiry of the periodic registration timer triggers the UE to perform the registration procedure. The UE strictly performs the registration procedure after 12 minutes (i.e., after the expiry of the PTAU timer), irrespective of a number of times the UE had been to the connected mode during the 12 minutes duration. Thus, in the conventional approaches, the UE performing periodic registration procedure with the "Strictly Periodic Registration Timer Indication" does not restart the timer on completing each data transmission i.e. each time UE goes to connected mode the PTAU timer is not stopped and neither started again when the UE goes back to IDLE mode.

Figure 1D:
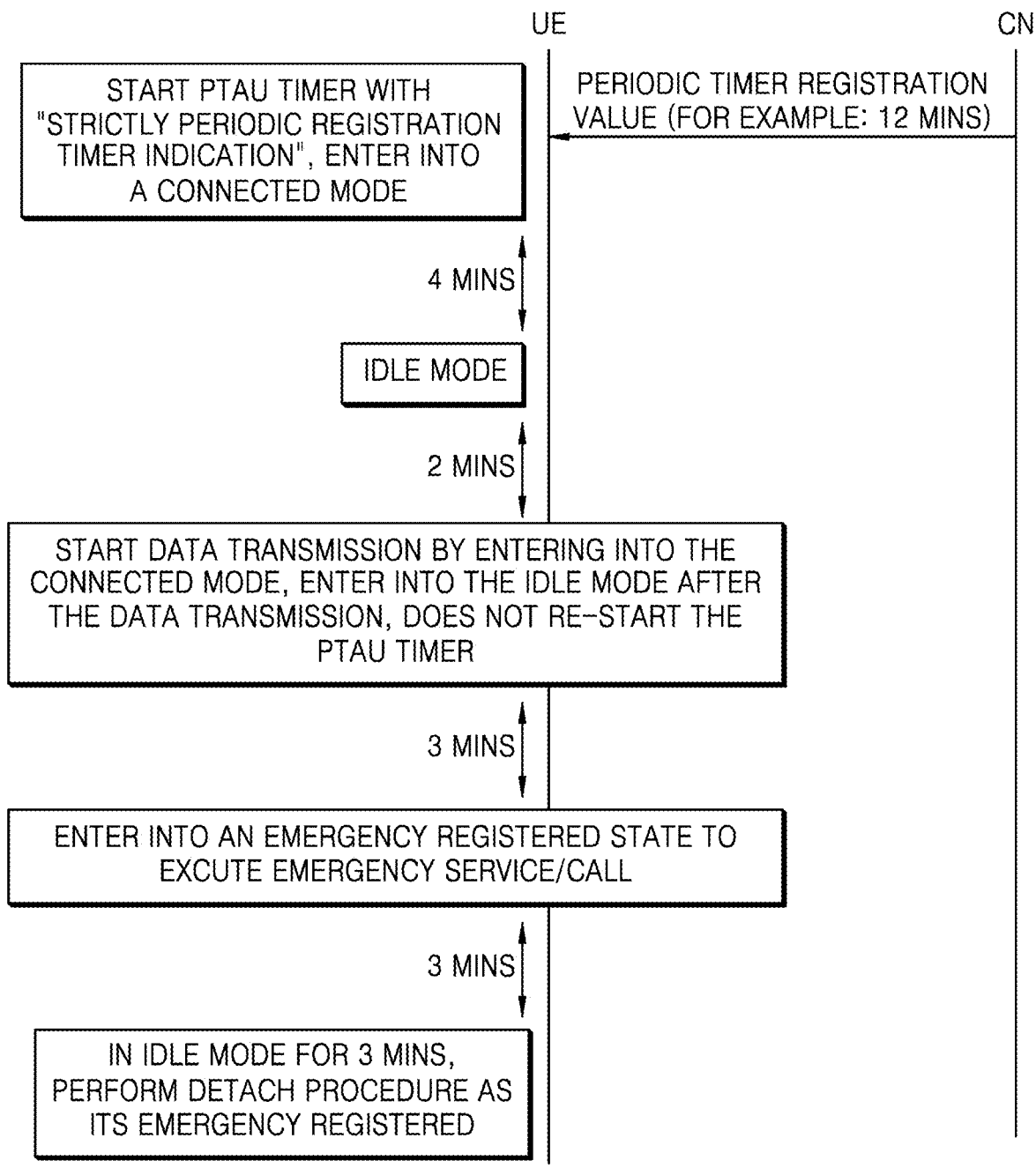

Consider an example scenario as depicted in FIG. 1D, wherein the UE performs the periodic registration procedure using the periodic registration timer with the "Strictly Periodic Registration Timer Indication". The UE sends a periodic registration request to the CN and receives a periodic registration timer value of 12 minutes (for example) from the CN. On receiving the periodic registration timer value, the UE starts executing/operating the PTAU timer by applying the received periodic registration timer value (for example: 12 mins) with the "Strictly Periodic Registration Time Indication". In an example, the PTAU timer behaves as the periodic registration timer with the "Strictly Periodic Registration Time Indication".

In an example herein, on starting the PTAU timer, the UE remains in the connected mode for 4 minutes and enters into the idle mode. After 2 minutes of entering into the idle mode, the UE starts the data transmission by entering into the connected mode. The UE may enter into the idle mode on completion of the data transmission. The UE may continue the periodic registration timer without restarting it when the UE enters into the idle mode. Further, after 3 minutes of entering into the idle mode, the UE executes the emergency service (for example, when the UE faces an authentication procedure failure) by entering into the emergency registered state. Once the emergency service is completed, the UE enters into the idle mode and remains in the idle mode until the expiry of the periodic registration timer. In an example scenario, the UE will remain in the idle mode only for 3 minutes. The expiry of the periodic registration timer triggers the UE to initiate the deregistration procedure. However, the duration/time in which the UE can remain in the idle mode has been drastically reduced due to the "Strictly Periodic Registration Timer Indication". Therefore, the UE may obtain a less period of time (in the current example, only 3 minutes when compared to 12 minutes as discussed in FIG. 1b) for receiving the emergency response or call back from the core network (CN).

Further, according to the current 3GPP TS 24.501, the UE may perform a registration procedure to access mission critical services (MCSs). The UE sends a registration request message to the CN for an initial registration for the MCSs. If the UE does not receive any response from the network, the UE enters into a 5GMM DEREGISTERED.REGISTRATION.ATTEMPTING-REGISTRATION state and starts a timer T3511. The UE re-starts the registration procedure after an expiry of a timer T3511 (for example; after 10 seconds). After a certain number of unsuccessful attempts, the UE starts a timer T3502. On expiry of the timer T3502 (for example: after 14 minutes), the UE initiates a next registration procedure. However, the UE may not able to initiate the registration procedure on receiving a request for the MCSs when the timer T3511 or T3503 is operating. Similarly, the MCSs are delayed, when the UE is in 5GMM-REGISTERED.ATTEMPTING-REGISTRATION-UPDATE state and when the timer T3510 or T3502 is operating.

In addition, when a service request procedure fails a certain number of times after the registration procedure, the UE starts a T3525 timer. In such a case, the UE is not allowed to initiate the next service request procedure for the MCSs till an expiry of the T3525 timer. Further, the UE may start a T3346 timer on the successful service request procedure. In such a case, the UE may not able to initiate any mobility management or connection management procedure till the expiry of the T3346 timer.

Thus, in the conventional approaches, the MCS is delayed for a considerable duration of time. This may lead to serious consequences during an emergency scenario.

Figure 2A:
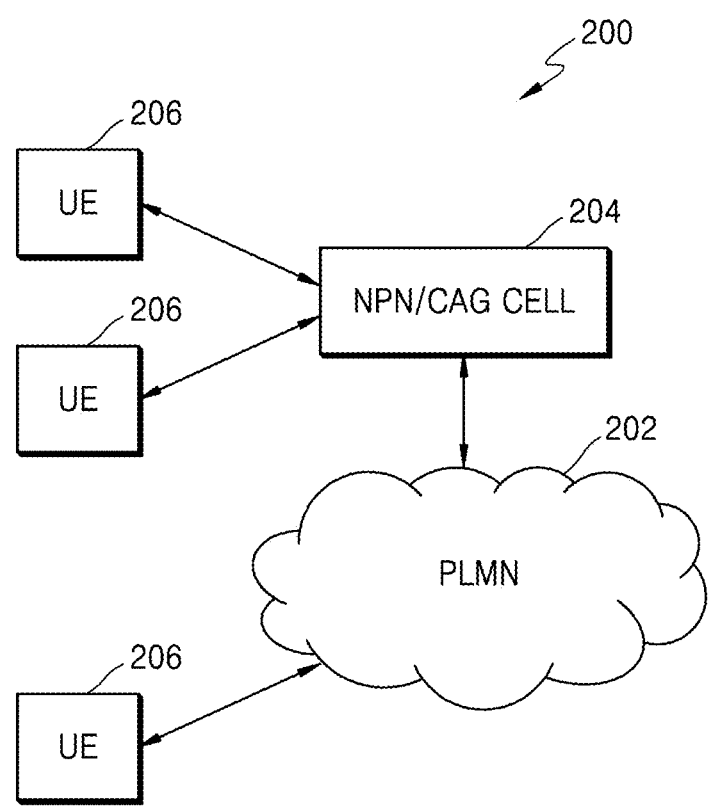
FIGS. 2A, 2B, and 2C depict a wireless communication system/wireless network for handling emergency services, wherein the wireless network includes at least one non-public network (NPN), and at least one public network, according to an embodiment of the disclosure.
Figure 2B:
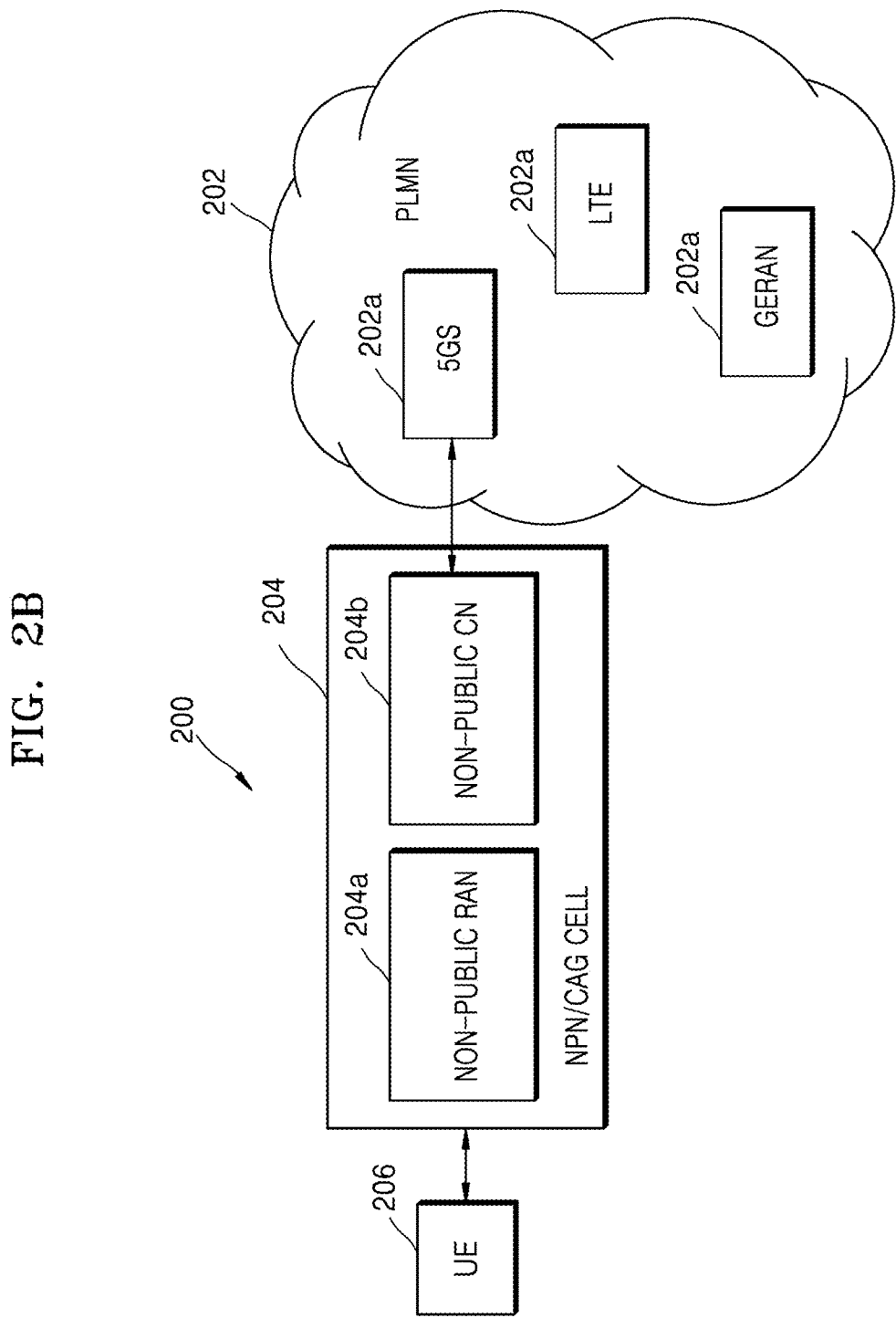
Figure 2C:
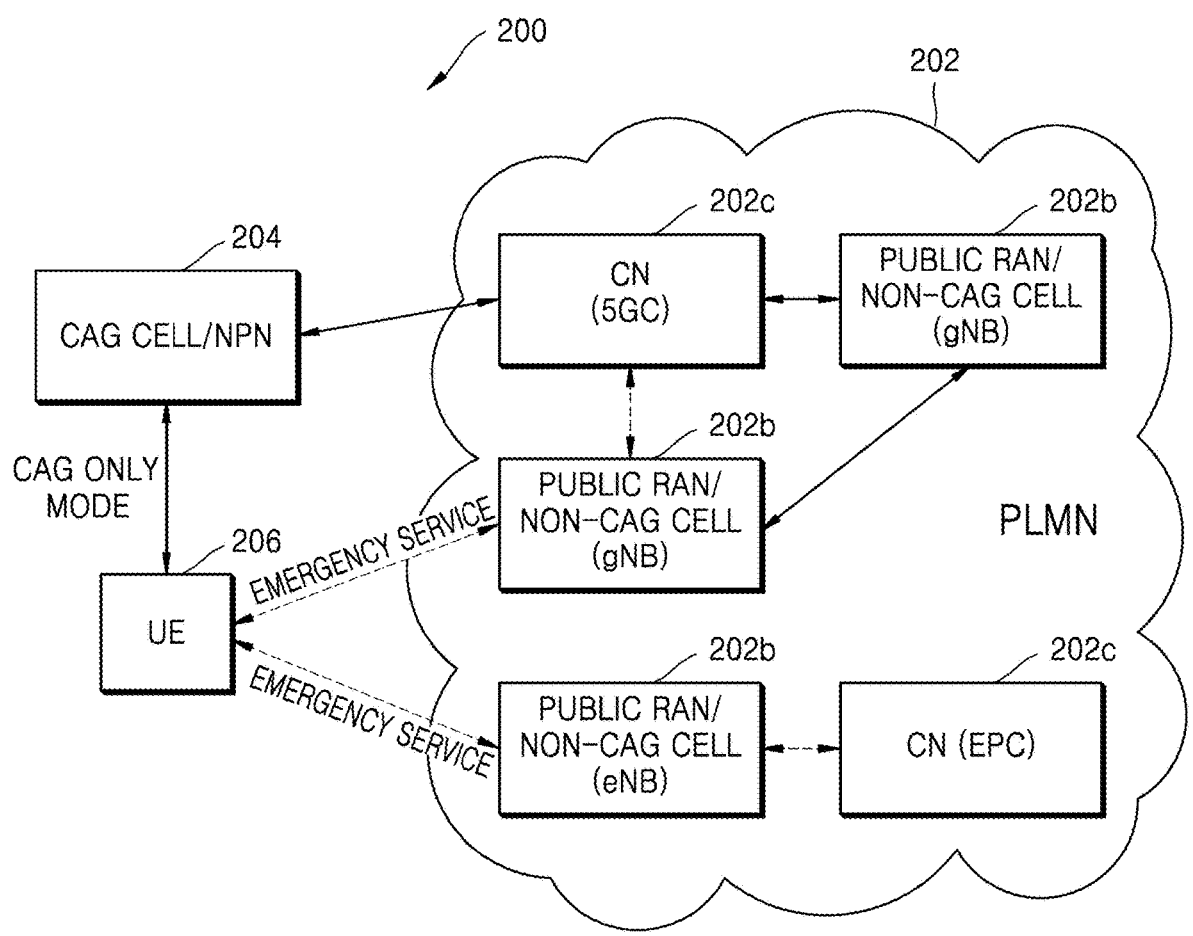

FIGS. 2A, 2B, and 2C depict a wireless communication system/wireless network 200 for handling emergency services, wherein the wireless network 200 includes at least one non-public network, and at least one public network, according to an embodiment of the disclosure. The wireless network 200 referred herein can be configured for handling emergency services during an emergency event/scenario. The emergency services can support real-time, high priority total conversation services such as, but not limited to, voice calls, video calls, real-time text messages, IP Multimedia Subsystem (IMS) emergency calls, or the like. Examples of the emergency event can be, but is not limited to, a medical event, a criminal attack, a natural disaster, an accident, an injury, and so on.

The wireless network 200 includes at least one Public Land Mobile Network (PLMN) 202, at least one non-public network (NPN) 204, and a plurality of User Equipments (UEs) 206. The PLMN 202 can be configured to provide PLMN services to the UEs 206 in a specific region. The PLMN services include normal communication services and the emergency services. Examples of the normal communication services can be, but is not limited to, a streaming service (streaming of multimedia data such as audio, video, text and so on), a file download service, a carousel service (a service for combining file download service and streaming service), a television (TV) service, an Internet Protocol (IP) Multimedia Subsystem (IMS) service, a non-3rd Generation Partnership Project (non-3GPP) service (for example: firewalling or the like), a short messaging service, a Multimedia Messaging Service (MMS), and so on. Examples of the emergency services can be, but is not limited to, an emergency call to local Fire/Ambulance/Police stations, an IMS call, text messages, and so on. The PLMN 202 can be operated by a mobile network operator (MNO) and can be identified using a PLMN_identifier (PLMN_ID). Embodiments herein use the terms such as "PLMN", "cellular network", "public network", "3GPP access network", and so on interchangeably to refer to a network that provides the emergency services, and the normal communication services in a given region.

As depicted in FIG. 2B, the PLMN 202 includes one or more different public cellular networks/Radio Access Technologies (RATs) 202a such, as, but not limited to, a Long Term Evolution (LTE) network, an advanced LTE network, a New Radio (NR)/5G network, a Narrowband Internet of Things (NB-IoT), a Universal Mobile Telecommunications Service (UMTS), a Global System for Mobile Communications (GSM) Enhanced Data rates for GSM Evolution (EDGE) Radio Access Network (GERAN) system or any other next generation networks.

As depicted in FIG. 2C, a RAT 202a of the PLMN 202 may include a plurality of Radio Access Networks (RANs)/public RANs 202b, and at least one Core Networks (CN) 202c. The RAN 202b and the CN 202c may comprise of one or more processors/Central Processing Units (CPUs), a memory, a storage, a transceiver, and so on, for performing at least one intended function/operation. The RAN 202b may comprise of nodes/Base Stations (BSs) such as, but not limited to, evolved nodes (eNBs), New Radio nodes (gNBs), and so on. The RAN 202b can be configured to connect the at least one UE 206 to the CN 202c. The RAN 202b can be configured to perform radio resource management functions such as, but not limited to, radio bearer control, radio admission control, connection mobility control, dynamic allocation of resources to the UE 206 in uplink/downlink (scheduling), and so on. Embodiments herein use the terms such as "RAN", "public RAN", "PLMN RAN", "public cell", and so on interchangeably to refer to an access node of the PLMN 202 that connects the UEs 206 to the at least one CN 202c.

The CN 202c referred herein can be at least one of an Evolved Packet Core (EPC), a 5G core (5GC) network, or the like. The CN 202c can be connected to the RAN 202b and an external data network. Examples of the external data network can be, but not limited to, the Internet, a Packet Data Network (PDN), an Internet Protocol (IP) Multimedia Core Network Subsystem, and so on. The CN 202c can be configured to connect the UEs 206 (that are connected to the associated RAN 202b) to the external data network for the communication services or the emergency services. Embodiments herein use the terms such as "CN", "public CN", "PLMN CN", and so on interchangeably to refer to a core network of the PLMN 202 that connects the UEs 206 to the external data network. In an example, as depicted in FIG. 2C, the PLMN 202 includes a 5G system (5GS) 202a and a LTE network 202b. The 5GS includes one or more gNBs/public cells 202b connected to a 5GC network 202c. The LTE network 202b includes one or more eNBs/public cells connected to an EPC network 202c.

The NPN(s) 204 can be configured to provide coverage and private services to the UEs 206 present within a location/premises such as, but is not limited to, an organization, an enterprise, an industry/factory, a campus, a room, a floor, a hospital, a stadium, an airport, a shopping center, and so on. The private services can include services that are defined by the respective premises. Examples of the private services can be, but is not limited to, a streaming service (streaming of multimedia data such as audio, video, text and so on), a file download service, a mission-critical service (for example; autonomous driving, control of a smart grid, smart operation of industrial automation processes, or any other service which requires different levels of security), and so on. The NPN 204 can be deployed as a non-standalone NPN, or a standalone NPN (SNPN). The non-standalone NPN can be deployed in conjunction with the PLMN 202 using a network slicing and/or a Closed Access Group (CAG) cell (as specified in 3GPP TS 23.501). The network slicing provides dedicated data network names (DNNs) networks, or one or more network slice instances that can make the NPN 204 available to the UEs 206 via the PLMN 202. The stand-alone NPN may be deployed without requiring the support of the PLMNs 202. The stand-alone NPN may use the CAG and/or a non-public network identifier to identify a group of subscribers/UEs, who are permitted to access the NPN. The CAG may be used by the NPN 204 to prevent users/UEs from automatically selecting and registering from a location/region/area, which does not provide access to the NPNs 204 for the UEs 206. The CAG may be used by the NPN 204 to prevent users/UEs from automatically selecting and registering from a location/region/area, where the UEs 206 are not allowed to access the NPNs 204. The NPN can be assigned a CAG Identifier (CAG ID) to identify it. Embodiments herein use the terms "CAG Identifier" and "non-public network identifier" interchangeably to refer to the CAG ID. The CAG ID can be the CAG-ID and/or NPN-ID. Embodiments herein use the terms such as, but not limited to, "NPN", "private network", "public network integrated NPN", "non-3GPP access network", "SNPN", "CAG cells", and so on interchangeably to refer to a network that confines the communication services within boundaries of the defined premises for the UEs 206. Embodiments herein are further explained considering the NPN 204 as the SNPN for example, but it may be obvious to a person skilled in the art that the non-standalone NPN can also be considered.

As depicted in FIG. 2B, the NPN 204 includes at least one non-public RAN 204a, and a non-public Core Network (CN) 204b. The non-public RAN referred herein can be a CAG cell including at least one of 3GPP access nodes, non-3GPP access nodes, and so on. Examples of the 3GPP access nodes can be, but not limited to, eNBs, gNBs, and so on. Examples of the non-3GPP access nodes can be, but is not limited to, a Local Access Network (LAN) node, a Wireless LAN (WLAN) node, a Wi-Fi node, and so on. The non-public RAN 204a can be configured to broadcast CAG IDs of the NPN 204 to the UEs 206. The UE 206 can identify and connect to the corresponding NPN 204 using the broadcasted CAG IDs, if the broadcasted CAG ID is present in an allowed list of CAG IDs configured for the UE 206. In an embodiment, the non-public RAN 204a can be configured to connect the UE 206 to the non-public CN 204b. In an embodiment, the NPN 204 can share the non-public RAN 204a with the PLMN 202 by assigning its own cell identities and tracking area codes to the non-public RAN 204a. In such a case, the non-public RAN of the NPN 204 can be a RAN of the PLMN 202 including an assistance of the CAG IDs. Embodiments herein use the terms such as "non-public RAN", "CAG cell RAN", "CAG cell", "SNPN RAN", "non-public/SNPN BS", "private RAN/BS", and so on interchangeably to refer to a node that broadcasts the CAG IDs to the UE 206 and connects the authorized UE 206 to the PLMN 202.

The non-public CN 204b referred herein can be at least one of an EPC network, a 5GC network, or the like. The non-public CN 204b can be connected to the non-public RAN 204a, a private data network/private enterprise network, and the CN 202c of the PLMN 202. The private data network/private enterprise may be operated by at least one of the enterprise, the organization, the industry, an external entity, or the like. Examples of the private data network can be, but is not limited to, an Intranet, a cloud platform, a server, and so on. In an embodiment, the non-public CN 204b can be configured to connect the UE 206 (that is connected to the non-public RAN 204a) to the private data network for the private services defined within the premises. In an embodiment, the non-public CN 204b can also be configured to connect the UE 206 (that is connected to the non-public RAN 204a) to the PLMN 202 for the PLMN services (i.e., the normal communication services and the emergency services). In an embodiment, the NPN 204 can share control plane functionalities of the non-public CN 204b with the PLMN 202. Embodiments herein use the terms such as "non-public CN", "private CN", and so on interchangeably to refer to a core network of the NPN 204.

In an embodiment, the NPN 204 including the CAG cell/non-public RAN 204a and the non-public CN 204b may be referred hereinafter as the CAG cell 204 through the document.

As depicted in FIGS. 2A-2C, the UE(s) 206 can be a user device that is capable of supporting the PLMN 202 and the NPN/CAG cell 204. Examples of the UE 206 can be, but is not limited to, a mobile phone, a smartphone, a tablet, a phablet, a personal digital assistant (PDA), a laptop, a computer, a wearable computing device, a vehicle infotainment device, an Internet of Things (IoT) device, a Virtual Reality (VR) device, a Wireless Fidelity (Wi-Fi) router, a USB dongle, a sensor, a robot, an auto-guided vehicle, and so on. The UE 206 can include one or more processors/Central Processing Units (CPUs), a memory, a transceiver, and so on, for performing at least one intended function/operation.

The UE 206 can be configured to register with the PLMN 202 (that can be a home PLMN (HLPMN)) and obtain the allowed list of CAG IDs/permission to access the CAG cells 204 and other permission/subscription details from the PLMN 202, wherein the CAG IDs identify the CAG cells 204. The UE 206 can select the CAG cell based on the received allowed list of CAG IDs for accessing the private services and for connecting to the PLMN 202 for the PLMN services. The UE 206 can automatically select the NPN/CAG cell 204 corresponding to one of the received allowed list of CAG IDs that is available in the location. The UE 206 can also provide the received allowed list of CAG IDs to the user and allow the user to select the NPN/CAG cell 204 corresponding to one of the allowed list of CAG IDs.

In an embodiment, the UE 206 can be configured to operate in a CAG only mode/CAG only feature. In the CAG only mode operation, the UE 206 can connect only to the allowed CAG cell 204 to access the PLMN 202 for the PLMN services. Embodiments herein use the terms such as "CAG only mode", "NPN access mode", "SNPN access mode", "SNPN support capability" and so on interchangeably to refer to a mode/state in which the UE 206 can only connect to the NPN/CAG cell 204.

In order to operate in the CAG only mode, the UE 206 sends a registration request to the CN 202c of the PLMN 202 through the public RAN 202b that supports the CAG cell. The public RAN 202b can be referred herein after as a non-CAG cell 202b through the document. Embodiments herein use the terms such as "non-CAG cell", "non-CAG RAN", "RAN", "public RAN", "PLMN RAN", "public cell", and so on, interchangeably through the document. The non-CAG cell/RAN 202b can be a public cell/RAN, which can be accessed by the UE 206 to obtain the normal communication service (for example: IMS voice call, internet services, and so on) provided by the public PLMN 202. The registration request may specify the CAG cell 204 selected by the UE 206 to connect and other permission/subscription details of the UE 206. The CN 202c of the PLMN 202 checks if the UE 206 has the permissions to connect to the selected CAG cell 204 based on the allowed list of CAG IDs configured for the UE 206 (according to 3GPP TS 24.501 specification). If the UE 206 has the permissions to connect to the selected CAG cell 204, the CN 202c of the PLMN 202 sends a registration accept message including an indicator, which can indicate to the UE 206 to operate in the CAG only mode.

The UE 206, which is enabled to operate in the CAG only mode, can initiate the emergency services in the emergency scenarios where the authentication of the UE 206 fails or the authentication of the UE 206 may not be performed. In an embodiment, the UE 206 can complete/perform the emergency services on the connected CAG cell 204, if the connected CAG cell 204 supports the emergency services. In such a case, the connected CAG cell 204 allows the UE 206 to connect to the CN 202*b* for performing/completing the emergency services.

In an embodiment, the UE 206 can be configured to operate in an emergency mode on initiating the emergency services. In an embodiment, the UE 206 can be configured to operate in the emergency mode, if the connected CAG cell 204 does not support the initiated emergency services or if the CAG cells 204 are not available in the location of the UE 206 when the UE 206 initiates the emergency services. In the emergency mode, the UE 206 connects to at least one non-CAG cell/public RAN 202*b* of the PLMN 202 for availing the emergency services. The emergency mode can be a limited mode that is enabled only on the initiation of the emergency services. Further, performing the emergency services in the emergency mode can be subjected to local regulation.

In order to be operated in the emergency mode, the UE 206 disables the CAG only mode (i.e. deselects the connected CAG cell for the emergency service) and sends an indication to the CN 202*c* of the PLMN 202 indicating that the UE 206 is not operating in the CAG only mode. On receiving the indication, the CN 202*c* of the PLMN 202 enables the UE 206 to operate in the emergency mode.

In the emergency mode, the UE 206 determines the one or more non-CAG cells 202*b* of the PLMN 202 available in the location of the UE 206 based on signals broadcasted by the one or more non-CAG cells 202*b* of the PLMN 202. The UE 206 selects the non-CAG cell 202*b* from the determined one or more non-CAG cells 202*b* that connects to the at least one CN 202*c* of the PLMN 202. The UE 206 attaches to the selected non-CAG cell 202*b* by establishing a Radio Resource Control (RRC) connection with the selected non-CAG cell 202*b*. On attaching to the selected non-CAG cell 202*b*, the UE 206 performs an emergency attach procedure with the CN 202*c* of the selected non-CAG cell 202*b* and establishes an emergency Protocol Data Unit (PDU) session with the external data network through the CN 202*c*. The UE 206 performs the emergency service over the established emergency PDU session. In an embodiment, in a 5G network, the emergency attach procedure may be referred to a registration performed with 5GS registration type "emergency registration" in the REGISTRATION REQUEST message. In an embodiment, in an Evolved Packet System (EPS)/LTE, the emergency attach procedure may be referred to attached for emergency bearer services. The UE 206 may be attached for the emergency bearer services, if the UE 206 has only a Public Data Network (PDN) connection for the established emergency bearer services.

In an embodiment, the UE 206 may establish the PDU session with the connected CAG cell 204 for performing the initiated emergency service. The UE 206 then selects the non-CAG cell 202*b* for completing the initiated emergency service.

In an embodiment, the CN 202*c* of the PLMN 202 enables the UE 206 to switch into the emergency mode from the CAG only mode, when the UE 206 loses the connection with the CAG cell 204 during an ongoing emergency service or when the emergency service is established. In the emergency mode, the CN 202*c* may handover the UE 206 from the connected CAG cell 204 to the non-CAG cell 202*b* of the PLMN 202 for completing the on-going/established emergency service.

On completion or release of the emergency service, the UE 206 enters into an idle mode and remains in the idle mode for a pre-defined period of time. In an embodiment, the period of time/value of the time can be pre-defined based on an implementation of the UE 206. In an example, the UE 206 may define the period of time in such a way that the period of time has to be long enough in case an emergency personal wants to re-initiate the emergency service with the user of the UE 206, if the initiated emergency service by the user of the UE 206 is dropped. In the idle mode, the UE 206 does not establish the RRC connection with any of the CAG cell 204 or the non-CAG cell 202*b*. Once the pre-defined period of time has passed, the UE 206 enables the CAG only mode automatically or by performing a registration update procedure with the CN 202*c* of the PLMN 202.

FIGS. 2A, 2B, and 2C depict exemplary units/components of the wireless network 200, but it is to be understood that other embodiments are not limited thereon. In other embodiments, the wireless network 200 may include less or a greater number of units. Further, the labels or names of the units are used only for illustrative purpose and does not limit the scope of the embodiments herein. One or more units can be combined together to perform same or substantially similar function in the wireless network 200.

Figure 3:
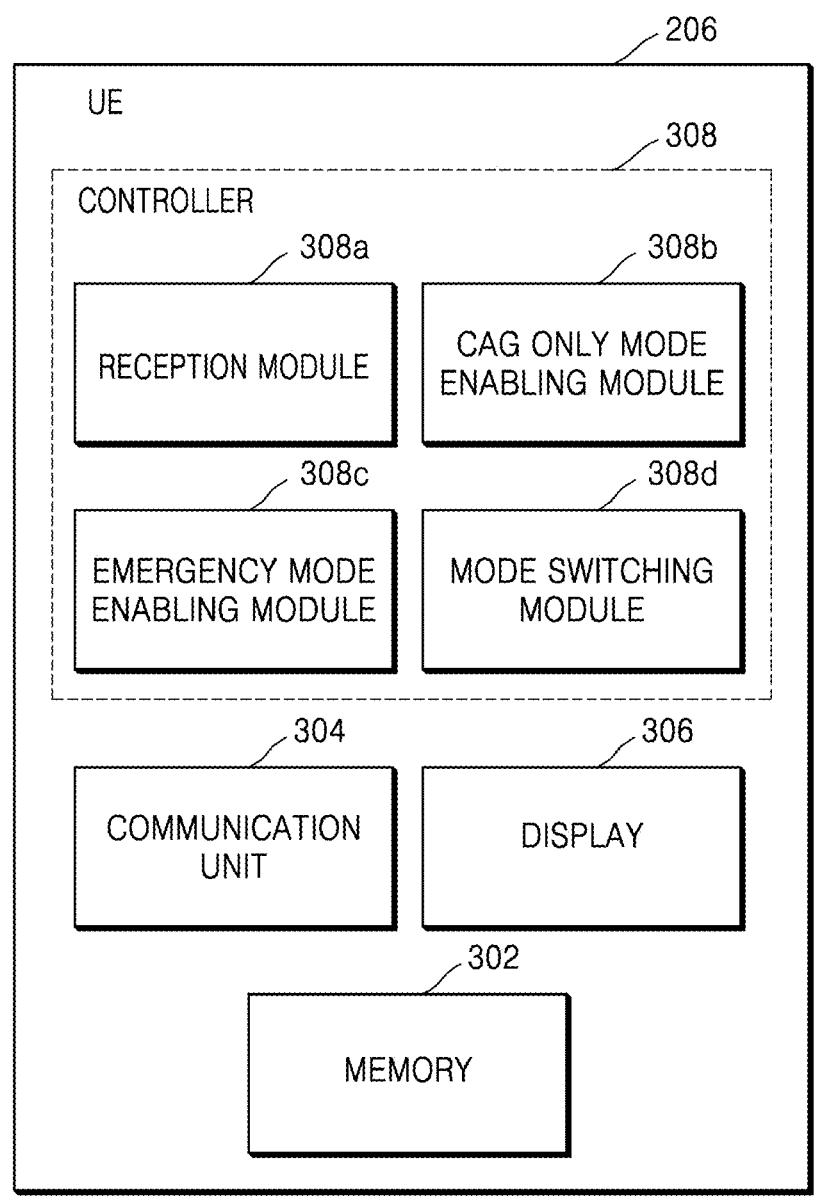
FIG. 3 depicts the UE configured to perform the emergency services by camping on a non-CAG cell, according to an embodiment of the disclosure.

FIG. 3 depicts the UE 206 configured to perform the emergency services by camping on the non-CAG cell 202*a*, according to an embodiment of the disclosure.

The UE 206 includes a memory 302, a communication unit 304, a display 306, and a controller 308. The UE 206 can also include at least one transceiver, a processing circuitry, a storage unit, an input/output (I/O) module, and so on (not shown).

The memory 302 can store at least one of the PLMN IDs, the allowed list of CAG IDs, and so on. Examples of the memory can be, but not limited to, NAND, embedded Multi Media Card (eMMC), Secure Digital (SD) cards, Universal Serial Bus (USB), Serial Advanced Technology Attachment (SATA), solid-state drive (SSD), and so on. Further, the memory 302 may include one or more computer-readable storage media. The memory 302 may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 302 may, in some examples, be considered a non-transitory storage medium. The term "non-transitory" may indicate that the storage medium is not embodied in a carrier wave or a propagated signal. However, the term "non-transitory" should not be interpreted to mean that the memory 302 is non-movable. In certain examples, a non-transitory storage medium may store data that can, over time, change (e.g., in Random Access Memory (RAM) or cache).

The communication unit 304 can be configured to enable the UE 206 to connect with at least one of the NPN/CAG cell 204, and the PLMN 202 over an interface. Examples of the interface can be, but not limited to, a wired interface, a wireless interface (for example: an air interface, an Nu interface, or the like), a wireless fronthaul interface, a wired or wireless backhaul interface, or any structure supporting communications over a wired or wireless connection.

The display 306 can be configured to enable the user to interact with the UE 206. The display 306 can also be configured to display the PLMN_IDs and the CAG IDs to the user. The display 306 can also be configured to allow the user to select the PLMN 202 corresponding to one of the PLMN IDs and the CAG cell 204, corresponding to one of the CAG IDs.

The controller 308 can be at least one of a single processer, a plurality of processors, multiple homogeneous or heterogeneous cores, multiple Central Processing Units (CPUs) of different kinds, microcontrollers, special media, and other accelerators. The controller 308 can be configured to handle the emergency services by enabling the UE 206 to camp onto the at least one non-CAG cell 202b of the PLMN 202.

The controller 308 includes a reception module 308a, a CAG-only mode enabling module 308b, an emergency mode enabling module 308c, and a mode switching module 308d.

The reception module 308a can be configured to receive subscription/permission details from the PLMN 202, while subscribing/registering with the PLMN 202. The permission details can be, but not limited to, the allowed list of CAG IDs/allowed CAG list (i.e. a list of CAG Identifiers corresponding to the NPN/CAG cells 204 that the UE 206 is allowed to access); and optionally, a CAG-only indication whether the UE 206 is only allowed to access the PLMN 202 via the CAG cells 204 (according to 3GPP TS 38.304). The reception module 308a stores the received permission details in the memory 302.

The CAG-only mode enabling module 308b can be configured to enable the UE 206 to operate in the CAG only mode. In the CAG only mode, the UE 206 can connect only to the CAG cell 204 to access the at least one CN 202c of the PLMN 202 for the normal communication services and/or the emergency services. The CAG-only mode enabling module 308b can perform the registration procedure with the at least one CN 202c of the PLMN 202 for enabling the UE 206 to operate in the CAG only mode, according to the 3GPP TS 24.501.

For enabling the UE 206 to operate in the CAG only mode, the CAG-only mode enabling module 308b uses the received allowed list of CAG IDs for selecting the at least one CAG cell 204 automatically or manually (i.e. allowing the user to select one of the CAG IDs corresponding to the CAG cell). The CAG-only mode enabling module 308b sends a registration request in a Non-Access Stratum (NAS) message to the CN 202c through the associated public-RAN 202b to enable the UE 206 to operate in the CAG only mode. The CN 202c verifies if the UE 206 is allowed to access the selected CAG cell 204 using the maintained permission details of the UE 206 (i.e. according to the 3GPP TS 24.501). If the UE 206 is allowed to access the selected CAG cell 204, the CN 202c of the PLMN 202 sends a registration accept in the NAS message with the indication to the UE 206. The indication indicates to the UE 206 that the UE is to operate in the CAG only mode. Thereby, the UE 206 can connect only to the CAG cell 204 for accessing the at least one CN 202c of the PLMN 202.

The emergency mode enabling module 308c can be configured to enable the UE 206 to operate in the emergency mode on initiating the emergency services. In an embodiment, in the emergency mode, the UE 206 can connect to any one of the non-CAG cells/public RANs 202b of the PLMN 202 to access any one of the CNs 202c of the PLMN 202. In an embodiment, the emergency mode enabling module 306 can enable the UE 206 to operate in the emergency mode, if the connected CAG cell does not support the initiated emergency services. In an embodiment, the emergency mode enabling module 306 can enable the UE 206 to operate in the emergency mode, if the UE 206 is not able to identify and connect to the CAG cell 204 available at the location for performing the initiated emergency services.

The emergency mode enabling module 308c may receive a request from the user through the display 306 for the emergency service (for example; to make a call to ambulance). In response to the received request, the emergency mode enabling module 308c initiates the requested emergency service. On initiating the requested emergency service, the UE 206 disables the CAG only mode by allowing the UE 206 to locally detach from the connected CAG cell 204, thereby the UE 206 enters into the emergency mode.

On disabling the CAG only mode, the emergency mode enabling module 308c determines/searches for the one or more non-CAG cells 202b of the PLMN 202 that are available in the location of the UE 206. The emergency mode enabling module 308c determines the one or more non-CAG cells 202b based on the signals broadcasted by the one or more non-CAG cells 202b. The emergency mode enabling module 308c then selects the non-CAG cell 202b from the determined one or more non-CAG cells 202b based on at least one factor. Examples of the factor can be, but not limited to, signal strength, reference signal strength power (RSRP), and so on.

Once the non-CAG cell 202b of the PLMN 202 is selected, the emergency mode enabling module 308c enables the UE 206 to connect to/camp on to the selected non-CAG cell 202b. The emergency mode enabling module 308c further enables the UE 206 to establish the RRC connection with the camped non-CAG cell 202b. The non-CAG cell 202b connects the UE 206 to the associated CN 202c in the PLMN 202. The emergency mode enabling module 308c then enables the UE 206 to perform the emergency attach procedure with the CN 202c through the connected non-CAG cell 202b. In the emergency attach procedure, the emergency mode module 3038c enables the UE 206 to send an emergency attach request to the CN 202c through the connected non-CAG cell 202b. The CN 202c establishes the emergency PDU session between the external data network and the UE 206 without authenticating the UE 206, as it receives the emergency attach request. Once the emergency PDU session is established, the emergency mode enabling module 308c enables the UE 206 to perform the initiated emergency service over the established PDU session. Thus, the UE 206 supporting the CAG only mode can perform the emergency services using the non-CAG cells 202b.

The mode switching module 308d can be configured to enable the UE 206 to enter into the idle mode on completion of the initiated emergency service using the non-CAG cell 202b. In the idle mode, the UE 206 can support the CN 202c of the PLMN 202. The mode switching module 308d can enable the UE 206 to remain in the idle mode for the pre-defined period of time. On the expiry of the pre-defined period of time, the mode switching module 308d enables the CAG only mode for the UE 206. In an embodiment, the mode switching module 308d enables the CAG only mode by itself that is without communicating with the PLMN 202. In an embodiment, the mode switching module 308d enables the CAG only mode by performing the registration updating procedure with the CN 202c of the PLMN 202.

FIG. 3 depicts exemplary units/components of the UE 206 configured for performing the emergency services using the non-CAG cells 202b, but it is to be understood that other embodiments are not limited thereon. In other embodiments, the UE 206 may include less or a greater number of units. Further, the labels or names of the units are used only for illustrative purpose and does not limit the scope of the embodiments herein. One or more units can be combined together to perform same or substantially similar function in the UE 206.

Figure 4A:
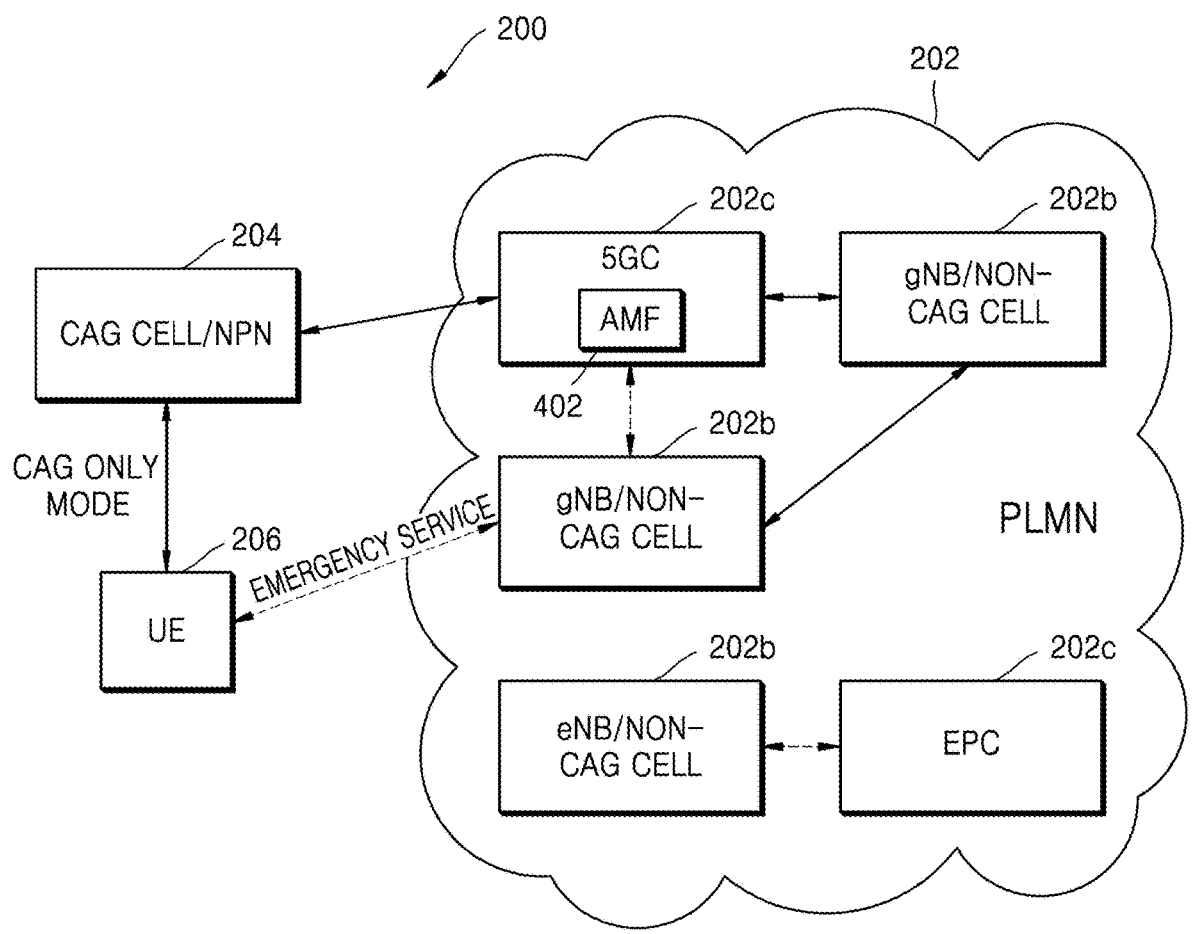
FIGS. 4A and 4B depict an example scenario of handling the emergency scenarios in the wireless network, according to an embodiment of the disclosure.
Figure 4B:
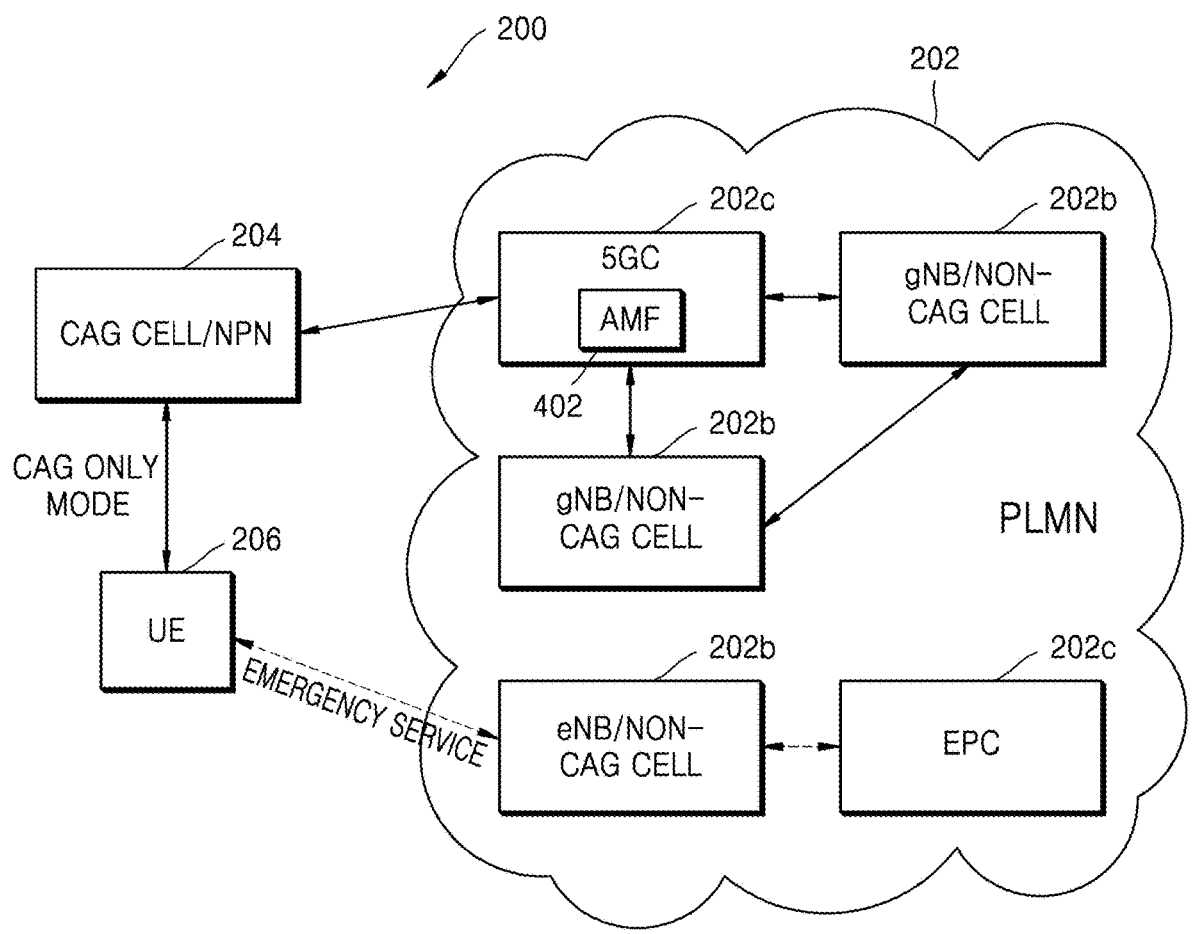

FIGS. 4A and 4B depict an example scenario of handling the emergency scenarios in the wireless network 200, according to an embodiment of the disclosure. Consider an example scenario, wherein the PLMN 202 includes a 5G system (5GS) 202a, and an LTE system/Evolved Packet System (EPS) 202a and the at least one CAG cell/NPN 204 is connected to the 5GS 202a. The 5GS 202a includes one or more gNBs/non-CAG cells 202b connected to the 5GC network 202c, and the LTE system 202a includes the one or more non-CAG cells 202b connected to the EPC network 202c. The 5GC 202c may include an access and mobility management function (AMF) 402, and other modules such as, but not limited to, an authentication server function (AUSF), a unified data management (UDM), and so on for performing the at least one intended function. The AMF 402 is configured to support functions such as, but not limited to, termination of NAS signaling, NAS ciphering and integrity protection, registration management, connection management, mobility management, access authentication and authorization, security context management, and so on.

In such a scenario, the UE 206 initiates the registration procedure with the 5GC 202c, such that the UE 206 operates in the CAG only mode. The UE 206 selects the CAG cell 204 for which the UE has the permissions to access. Thereafter, the UE 206 sends the registration request in the NAS message to the AMF 402 of the 5GC 202c through one of the gNBs/non-CAG cell 202b for configuring the UE 206 to operate in the CAG only mode. The AMF 402 may verify the permissions of the UE 206 to allow the selected CAG cell and configure the UE 206 to operate in the CAG only mode when the UE 206 has the permissions to access the selected CAG cell 204. Thus, in the CAG only mode, the UE 206 can connect only to the CAG cell 204 to access the 5GS 202a of the PLMN 202 for the 5GS/PLMN services.

The UE 206, configured to operate in the CAG only mode, may initiate the emergency services during the emergency event. In an example herein, consider that the UE 206 supporting the CAG only mode receives a request from the user to make an emergency call to a fire station and the UE 206 does not find the CAG cell 206 to perform the emergency call. In such a scenario, embodiments herein enable the UE 206 to disable the CAG only mode and to connect to the one of the non-CAG cells 202b of the PLMN 202 to perform the emergency call.

For performing the emergency call, the UE 206 performs a search to determine the available non-CAG cells 202b of the PLMN 202 in the location of the UE 206, wherein non-CAG cells 202b may connect to the 5GC 202c of the 5GS 202a or to the EPC 202c of the LTE. In an example herein as depicted in FIG. 4A, consider that the UE 206 determines the non-CAG cell/gNB 202b connected to the 5GC 202c and selects the determined non-CAG cell 202b for performing the emergency call. The UE 206 connects to/camp on to the selected non-CAG cell/gNB 202b. The UE 206 performs the emergency attach procedure with the AMF 402 of the 5GC 202c through the connected non-CAG cell/gNB 202b and establishes the emergency PDU session with the external data network through the 5GC 202c. On establishing the PDU session, the UE 206 can perform the emergency call to the fire exchange over the established emergency PDU session.

In an example herein as depicted in FIG. 4B, consider that the UE 206 determines the non-CAG cell s/eNBs 202b connected to the EPC 202c and selects the one of the determined non-CAG cell s/eNBs 202b based on the associated signal strength for performing the emergency call. The UE 206 connects to/camp on to the selected non-CAG cell/eNB 202b. The UE 206 performs the emergency attach procedure with the EPC 202c through the connected non-CAG cell/eNB 202b and establishes the emergency PDU session with the external data network through the EPC 202c. On establishing the PDU session, the UE 206 can perform the emergency call to the fire station over the established emergency PDU session. Thus, the UE 206, configured to operate in the CAG only mode, can also camp on the non-CAG cells (supporting different RATs) only during the emergency events for performing the emergency services.

Figure 5:
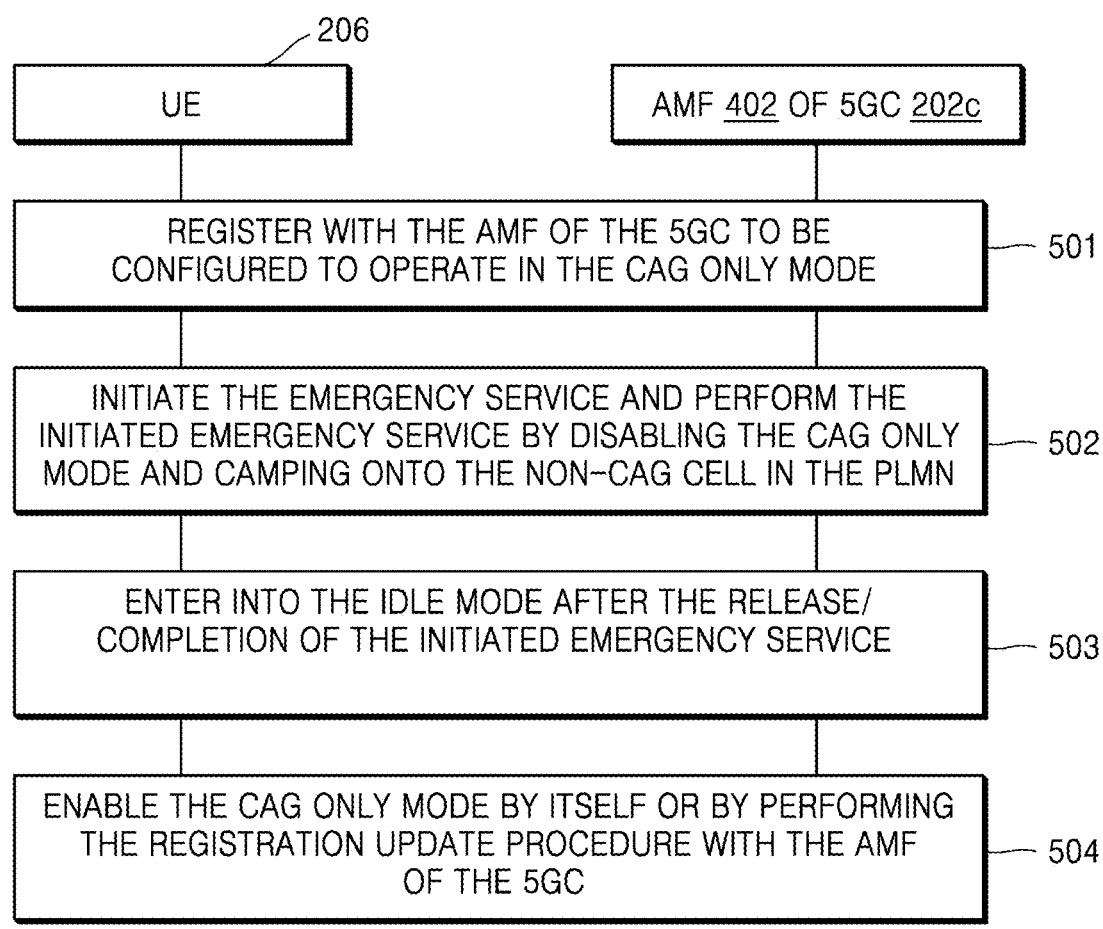
FIG. 5 is an example sequence diagram depicting the handling of the emergency service using the non-CAG cells, according to an embodiment of the disclosure.

FIG. 5 is an example sequence diagram depicting the handling of the emergency service using the non-CAG cells 202b, according to an embodiment of the disclosure. In an example herein, consider that the CAG cell/NPN 204 is connected to the 5GS of the PLMN 202. The 5GS of the PLMN 202 includes a plurality of non-CAG cells/gNBs 202b, and the 5GC 202c.

At step 501, the UE 206 registers with the AMF 402 of the 5GC 202c to be configured to operate in the CAG only mode. In the CAG only mode, the UE 206 can connect only to the CAG cell 204 to access the 5GC 202c.

At step 502, the UE 206 receives a request from the user for the emergency service. In such a case, the UE 206 disables the CAG only mode. The UE 206 may select any one of the non-CAG cells that are available in the location of the UE 206, wherein the non-CAG cells can be gNBs or eNBs connecting to the 5GC or the EPC. In an example herein, the UE 206 may select any one of the non-CAG cell/gNBs 202b of the 5GS 202a that are available in the location of the UE 206. The UE 206 camps onto the selected non-CAG cell/gNB 202b for initiating the emergency service. The UE 206 performs the emergency attach procedure with the AMF 402 of the 5GC 202c that is connected to the camped non-CAG cell/gNB 202b and establishes the PDU session with the external data network through the 5GC 202c. The UE 206 thereafter can perform the emergency services over the established PDU session.

At step 503, the UE 206 enters into the idle mode on the release/completion of the initiated emergency service. The UE 206 remains in the idle mode for the pre-defined period of time. On the expiry of the pre-defined time, at step 504, the UE 206 again enables the CAG only mode by itself or by performing the registration update procedure with the AMF 402 of the 5GC 202c.

Figure 6:
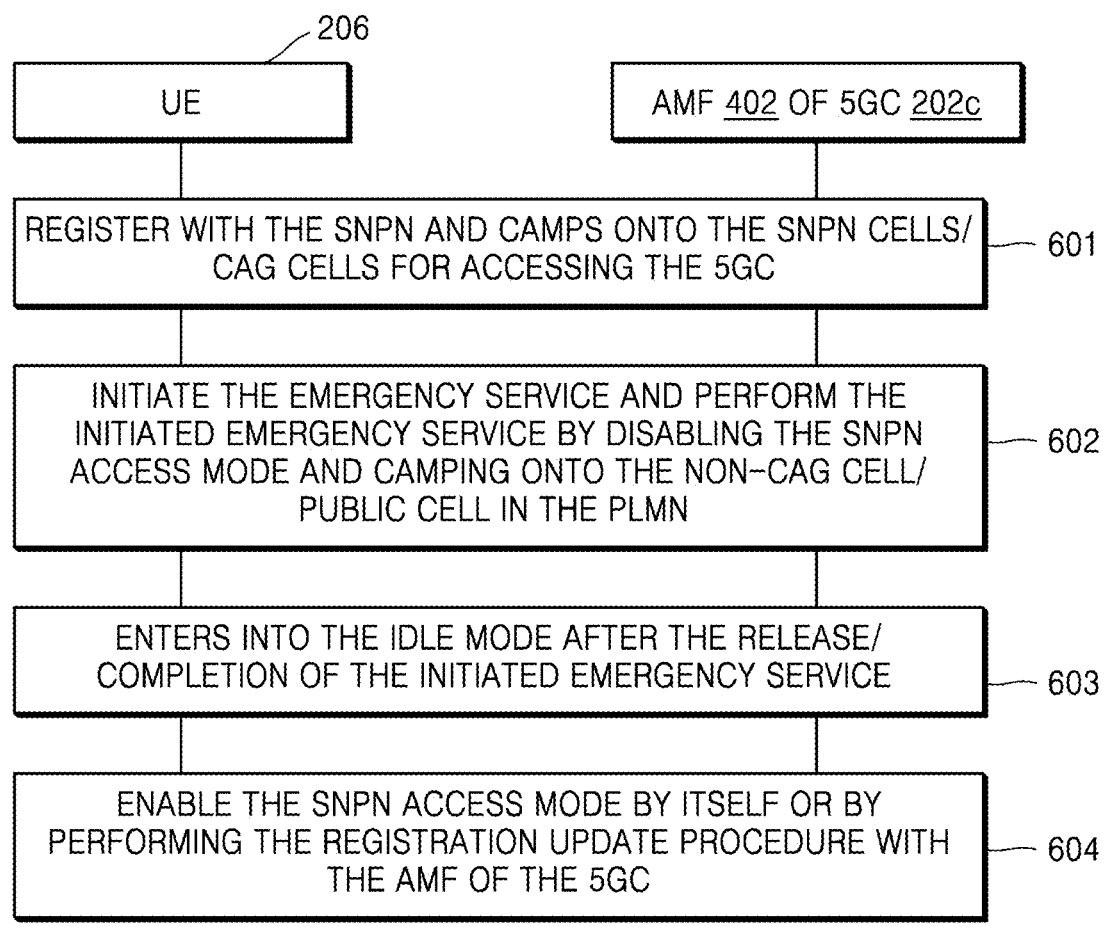
FIG. 6 is an example sequence diagram depicting the handling of the emergency service using the non-CAG cells in the wireless network that includes a Standalone-NPN (SNPN), according to an embodiment of the disclosure.

FIG. 6 is an example sequence diagram depicting the handling of the emergency service using the non-CAG cells 202b in the wireless network 200 that includes the SNPN 204, according to an embodiment of the disclosure. In an example herein, consider that the wireless network 200 includes the SNPN 204 as the NPN 204. The SNPN 204 can connect to the 5GS 202a. The UE 206 can support the SNPN 204 and the PLMN 202. In such a case, at step 601, the UE 206 registers with the SNPN 204 and camps onto the SNPN cells/CAG cells for accessing the 5GC 202a (i.e., configured to operate in the SNPN access mode (CAG only mode)).

At step 602, the UE 206 receives a request from the user for the emergency service. In such a case, the UE 206 disables the SNPN access mode by disabling an Access Stratum (AS) layer and NAS capability related to SNPN. The UE 206 may select any one of the non-CAG cells that are available in the location of the UE 206, wherein the non-CAG cells can be gNBs or eNBs connecting to the 5GC or the EPC. In an example herein, consider that the UE 206 may select any one of the non-CAG cell/gNBs 202b of the 5GS 202a that are available in the location of the UE 206. The UE 206 camps onto the selected non-CAG cell/gNB 202b for initiating the emergency service. The UE 206 performs the emergency attach procedure with the AMF 402 of the 5GC 202c that is connected to the camped non-CAG cell/gNB 202b and establishes the PDU session with the external data network through the 5GC 202c. The UE 206 thereafter can perform the emergency services over the established PDU session.

At step 603, the UE 206 enters into the idle mode on the release/completion of the initiated emergency service. The UE 206 remains in the idle mode for the pre-defined period of time. Once the pre-defined period of time has passed, at step 604, the UE 206 again enables the SNPN access mode.

Figure 7:
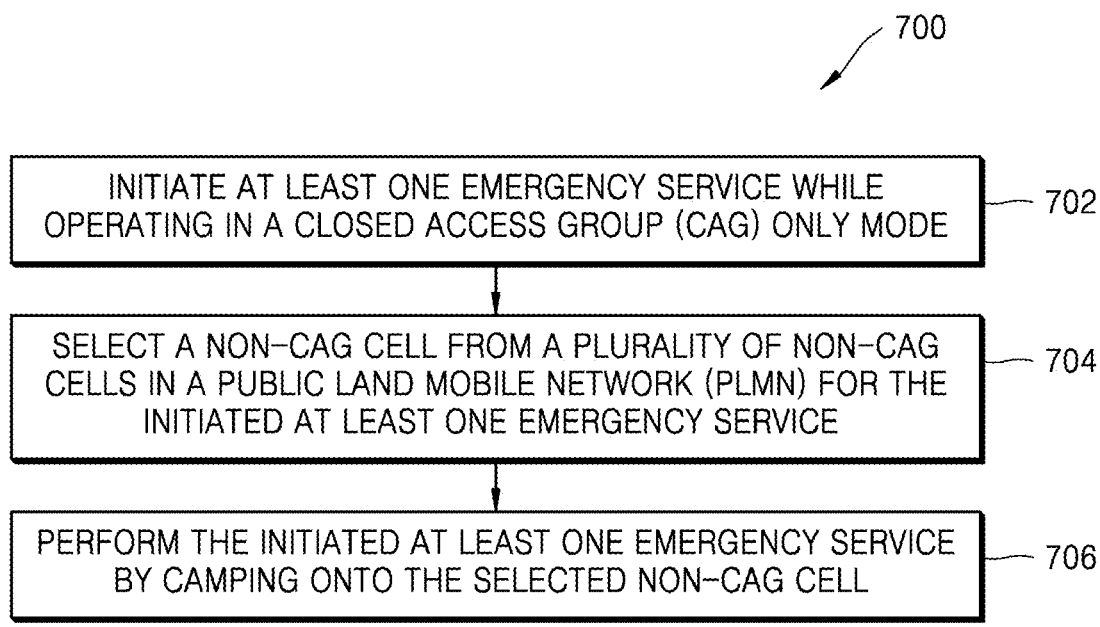
FIG. 7 is a flow diagram depicting a method for handling the emergency services in the wireless network including the NPN and the PLMN, according to an embodiment of the disclosure.

FIG. 7 is a flow diagram 700 depicting a method for handling the emergency services in the wireless network 200 including the NPN 204 and the PLMN 202, according to an embodiment of the disclosure.

At step 702, the method includes initiating, by the UE 206, the at least one emergency service while operating in the CAG only mode. In the CAG only mode, the UE 206 access only the at least one CAG cell/NPN 204.

At step 704, the method includes selecting, by the UE 206, the non-CAG cell 202b from the plurality of CAG cells in the PLMN. The non-CAG cell 202b can be a public RAN that provides the normal communication services and the emergency services to the UE 206 by supporting the at least one CAG cell 204. The UE 206 can perform the initiated at least one emergency service by establishing the PDU session or by establishing the emergency attach procedure with the non-CAG cell 202b. The various actions in method 700 may be performed in the order presented, in a different order or simultaneously. Further, in some embodiments, some actions listed in FIG. 7 may be omitted.

Figure 8A:
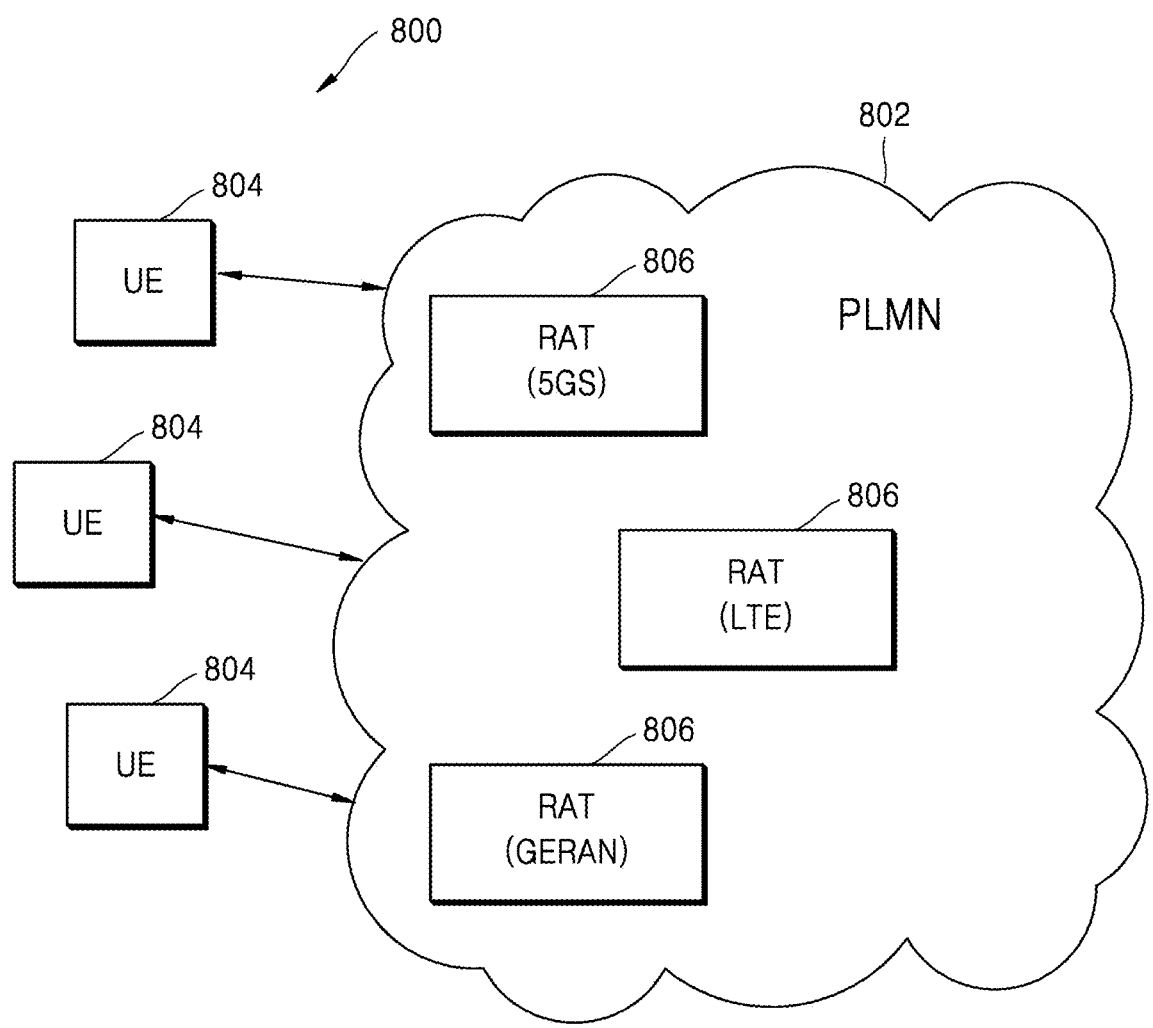
FIGS. 8A and 8B depict another wireless network/wireless communication system for handling the emergency services while performing periodic registration procedures, according to an embodiment of the disclosure.
Figure 8B:
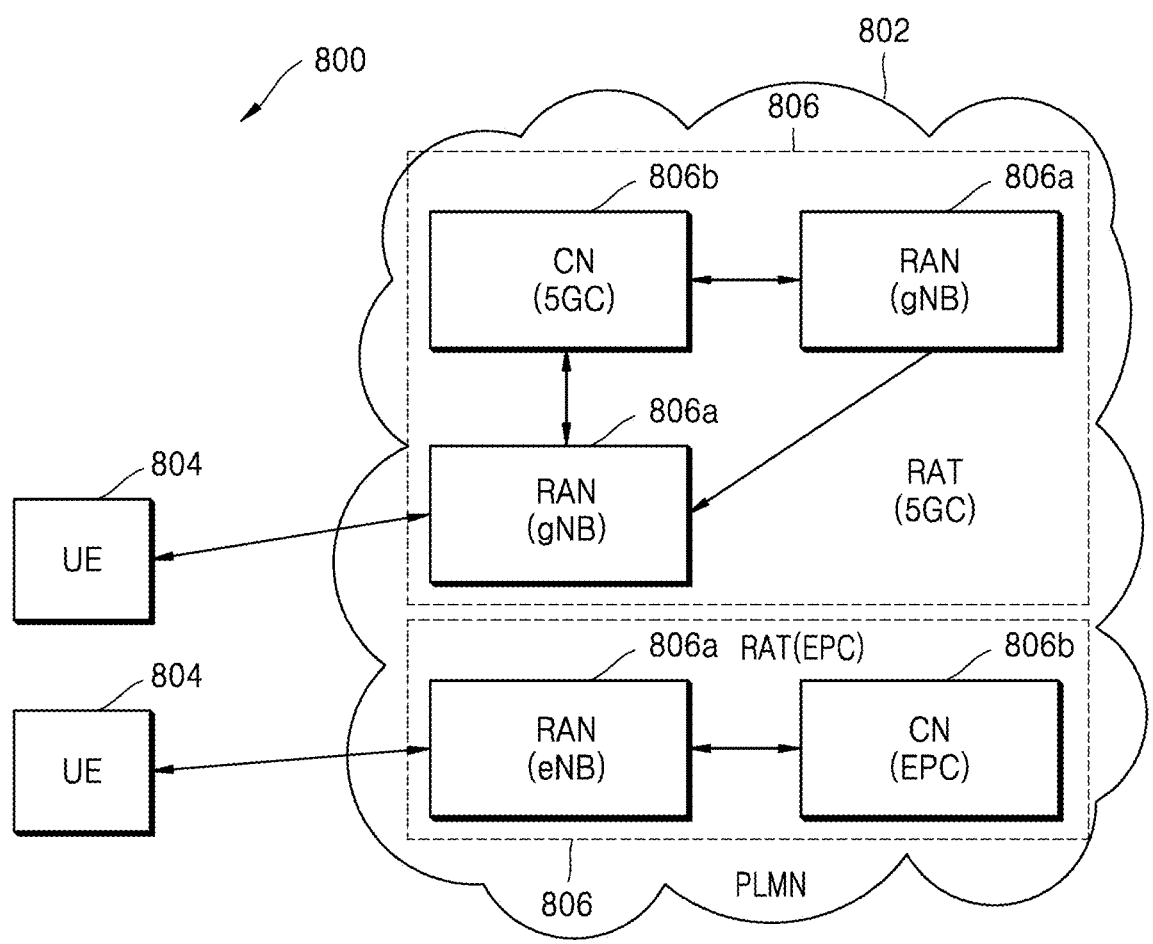

FIGS. 8A and 8B depict another wireless network/wireless communication system 800 for handling the emergency services while performing periodic registration procedures, according to an embodiment of the disclosure. The wireless network 800 referred herein can be configured for handling emergency services while performing periodic registration procedures by at least one UE. The emergency services can support real-time, high priority total conversation services such as, but not limited to, voice calls, video calls, real-time text messages, IP Multimedia Subsystem (IMS) emergency calls, or the like. Examples of the emergency event can be, but is not limited to, a medical event, a criminal attack, a natural disaster, an accident, an injury, and so on. The periodic registration procedure may be performed to update location information of the at least one UE and mobility registered state with the network 800 for tracking the at least one UE.

The wireless network 800 includes at least one PLMN 802 and a plurality of UEs 804. The PLMN 802 can be configured to provide PLMN services to the UEs 804 in a specific region. The PLMN services include communication services and emergency services. Examples of the communication services can be, but is not limited to, a streaming service (streaming of multimedia data such as audio, video, text and so on), a file download service, a carousel service (a service for combining file download service and streaming service), a television (TV) service, an Internet Protocol (IP) Multimedia Subsystem (IMS) service, a non-3rd Generation Partnership Project (3GPP) service (for example: firewalling or the like), a short messaging service, a Multimedia Messaging Service (MMS), and so on. Examples of the emergency services can be, but not limited to, emergency calls to local Fire/Ambulance/Police stations, IMS calls, text messages, and so on. The PLMN 802 can be operated by a mobile network operator (MNO) and can be identified using a PLMN_identifier (PLMN_ID). Embodiments herein use the terms such as "PLMN", "cellular network", "public network", "3GPP access network", and so on, interchangeably to refer to a network that provides the emergency services, and the communication services to public use in a given region.

The PLMN 802 includes one or more different public cellular networks/RATs 806 such, as, but not limited to, a Long Term Evolution (LTE) network, an advanced LTE network, a New Radio (NR)/5G network, a Narrowband Internet of Things (NB-IoT), a Universal Mobile Telecommunications Service (UMTS), a Global System for Mobile Communications (GSM) Enhanced Data rates for GSM Evolution (EDGE) Radio Access Network (GERAN) system or any other next generation networks. The RATs 806 includes a plurality of RANs 806a, and at least one CN 806b. The RAN 806a and the CN 806b may comprise of one or more processors/Central Processing Units (CPUs), a memory, a storage, a transceiver, and so on, for performing at least one intended function/operation.

The RAN 806a may comprise of nodes/Base Stations (BSs) such as, but not limited to, evolved nodes (eNBs), New Radio nodes (gNBs), a new radio access network supporting both an eNB, and a gNB, and so on. The RAN 806a can connect the at least one UE 804 to the at least one CN 806b. The RAN 806a can be configured to perform radio resource management functions such as, but not limited to, radio bearer control, radio admission control, connection mobility control, dynamic allocation of resources to the UE in uplink/downlink (scheduling), and so on.

The CN 806b referred herein can be at least one of an Evolved Packet Core (EPC), a 5G core (5GC) network, or the like. The CN 806b can be connected to the RAN 806a and an external data network. Examples of the external data network can be, but not limited to, the Internet, a Packet Data Network (PDN), an Internet Protocol (IP) Multimedia Core Network Subsystem, and so on. The CN 806b can be configured to connect the at least one UE 804 to the external data network for the communication services or the emergency services. In an example, as depicted in FIG. 8B, the PLMN 802 includes a 5G system (5GS) 806 and a LTE network 808. The 5GS 806 includes a plurality of gNBs/RANs 806a connected to at least one 5GC 806b. The LTE network 808 includes a plurality of eNBs/RANs 806a connected to at least one EPC 806b.

The UE(s) 804 can be a user device that is capable of supporting the PLMN 802. Examples of the UE 804 can be, but is not limited to, a mobile phone, a smartphone, a tablet, a phablet, a personal digital assistant (PDA), a laptop, a computer, a wearable computing device, a vehicle infotainment device, an Internet of Things (IoT) device, a Virtual Reality (VR) device, a Wireless Fidelity (Wi-Fi) router, a USB dongle, a sensor, a robot, an auto-guided vehicle, and so on. The UE 804 can include one or more processors/Central Processing Units (CPUs), a memory, a transceiver, and so on, for performing at least one intended function/operation. In an embodiment, the UE 804 can be configured to operate in a Mobile Initiated Connection Only (MICO)

mode by registering with the CN 806b of the PLMN 802. The UE 804 may operate in the MICO mode, when the UE 804 wants to perform only an uplink data transfer. Thus, in the MICO mode, the UE 804 can only send data (for example: text messages, media (for example; audio, video, images, and so on), sensor data, and so on)) to the at least one CN 806b of the PLMN 802 without receiving any downlink data from the CN 806b. Thus, in the MICO mode, the CN 806b does not perform paging for the UE 804.

In an embodiment, the UE 804 has to perform a registration management procedure and a signaling/connection management procedure in order to register location information and ensure that information about where the UE 804 is currently located is continuously up-to-date and correct in the location registers of the PLMN 802. Thus, the CN 806b can track the UE 804 continuously. In an embodiment, the UE 804 performs the registration and connection management procedures according to 3GPP 23.501 subclause 5.3.7.

The UE 804 performs the registration management procedure to register/de-register with the at least one CN 806b of the PLMN 802 and establish UE context in the CN 806b. The UE 804 performs a registration procedure to register with the CN 806b to receive the services that requires registration. On registering with the CN 806b, if applicable, the UE can update its registration to the CN 806b to periodically maintain reach ability/location (i.e., periodic registration update), or update its capability or re-negotiate protocol parameters upon movement (mobility registration update). Further, the UE 804, and the CN 806b uses two states; a de-registered state (RM-DEREGISTERED/ 5GMM-DEREGISTERED state) and a registered state (RM-REGISTERED/5GMM-REGISTERED state); that reflect a registration status of the UE 804 in the PLMN 802. In the de-registered state, the UE 804 is not registered with the CN 806b of the PLMN 802. The UE context in CN 806b holds no valid location or routing information for the UE 804, so the UE 804 is not reachable by the CN 806b of the PLMN 802. However, some parts of the context of the UE may still be stored in the UE 804 and the CN 806b to avoid performing an authentication procedure during every registration procedure. In the registered state, the UE 804 can be registered with the CN 806b and the UE 804 can receive the services that require registration with the CN 806b.

The UE 804 performs the connection management procedure for establishing and releasing a NAS signaling connection between the UE 804 and the CN 806b of the PLMN 802. The NAS signaling connection enables NAS signaling exchange between the UE 804 and the CN 806b. In the connection management, two connection management states (an idle state (CM-IDLE/5GMM-IDLE state) state and a connected state (CM-CONNECTED/5GMM-CONNECTED state)) can be used to reflect the NAS signaling connection of the UE 804 with the CN 806b. In the idle state, the UE 804 may be in the registered state without having the NAS signaling connection established with the CN 806b. In the idle state, the UE 804 performs at least one of cell section, cell re-selection, PLMN selection, and so on. In the connected state, the UE 804 establishes the NAS signaling with the CN 806b.

The UE 804 performs a periodic registration procedure with the CN 806b of the PLMN 802 during the registration state to initially update its reach ability or the location information with the CN 806b. The UE 804 may perform the periodic registration procedure, according to the 3GPP specification. In an embodiment, the UE 804 can operate in the MICO mode to perform the periodic registration procedure during the registration state. In response to the periodic registration procedure performed during the registration state, the CN 806b allocates a periodic registration timer value for the UE 804 and sends the allocated periodic registration timer value with a strict indication ("Strictly Periodic Timer Registration Indication") to the UE 804. The periodic registration timer value may indicate time/duration within which, the UE 804 has to perform the periodic registration procedure again to periodically update its reach ability or the location to the CN 806b. In an embodiment, the CN 806b may allocate the periodic registration timer value to the UE 804 based on factors such as, but not limited to, local policies, subscription information, information that has been provided by the UE 804, and so on. During the received periodic registration timer value, the UE 804 can enter into the connected state for the data transmission and into the idle state on completion of the data transmission for a number of times.

In order to track the periodic registration timer value, the UE 804 maintains a periodic tracking area update (PTAU) timer (for example; a T3512 timer). In an embodiment, on receiving the periodic registration timer value with the "Strictly Periodic Timer Registration Indication" from the CN 806b, the UE 804 operates the PTAU timer in a strictly periodic registration mode. In the strictly periodic registration mode, the UE 804 applies the received periodic registration timer value to the PTAU timer with the strict indication ("Strictly Periodic Timer Registration Indication"). Thus, the PTAU timer may behave as a periodic registration timer with "Strictly Periodic Timer Registration Indication". While operating in the strictly periodic registration mode, the PTAU timer does not terminate/stop, when the UE 804 moves from the idle state/mode to the connected state/mode. While operating in the strictly periodic registration mode, the PTAU timer does not restart, when the UE 804 moves from the connected mode/state to the idle state/mode. Thus, in the strictly periodic registration mode, the PTAU timer starts operating with a value of 0 and expires only when the PTAU timer reaches the received periodic registration timer value, irrespective of the movement of the UE 804 from the idle state to the connected state or vice-versa. The UE 804 strictly performs the periodic registration procedure with the CN 806b of the PLMN 802 only on the expiry of the PTAU timer and irrespective of the number of times that the UE had been to the connected state or the idle state during the received periodic registration timer value.

Further, the UE 804 may initiate the emergency service during the received periodic registration timer value or while the PTAU timer is operating. In an embodiment, the UE 804 switches the behavior of the PTAU timer from the strictly periodic registration mode to a normal periodic registration mode, on initiating the emergency service. In the normal periodic registration mode, the UE 804 may apply the periodic registration timer value to the timer without the strict indication. In the normal periodic registration mode, the PTAU timer may terminate, when the UE 804 moves from the idle state to the connected state. In the normal periodic registration mode, the PTAU timer may reset and restarted, when the UE 804 moves from the connected state to the idle state. The UE 804 performs the initiated at least one emergency service on the behavior of the timer being switched.

On initiating the emergency service, the UE 804 performs an emergency attach procedure with the CN 806b and establishes an emergency PDU session with the external data network through the CN 806b (according to 3GPP specification). In embodiment, on establishing the emergency PDU session, the UE 804 stops operating/disables the PTAU timer and switches the behavior of the PTAU timer from the periodic registration timer value with the "Strictly Periodic Timer Registration Indication" into a normal periodic registration timer/pre-release 16 behavior. In an embodiment, switching the behavior of the PTAU timer on initiating the emergency service includes applying the received periodic registration timer value to the PTAU timer without "Strictly Periodic Timer Registration Indication".

In an embodiment, if the UE 804 initiates the emergency service while operating in the MICO mode, the UE 804 disables the MICO mode, and the CN 806b disables the registered MICO mode of the UE 804. Further, the UE 804 performs an emergency attach procedure with the CN 806b and establishes an emergency PDU session with the external data network through the CN 806b. Thereafter, the UE 804 stops operating the PTAU timer and the CN 806b stops monitoring the PTAU timer of the UE 804. The UE 804 then switches the behavior of the PTAU timer from the periodic registration timer value with the "Strictly Periodic Timer Registration Indication" into the normal periodic registration timer/pre-release 16 behavior. Thus, when the UE 804 and the CN 806b disables the MICO mode on initiating the emergency service, the UE 804 and the CN 806b may behave as if there was no 'Strictly Periodic Registration Timer Indication' indication has been provided to the UE 804 in the last registration procedure.

Once the PTAU timer stops operating and the behavior of the PATU timer is switched, the UE 804 performs the emergency service over the established emergency PDU session (according to the 3GPP specification). On completion or release of the emergency service, the UE 804 enters into the idle state, starts the PTAU timer to operate and remains in the idle state till the expiry of the PTAU timer. In an embodiment, as the behavior of the PTAU timer is switched, the PTAU timer starts operating from a value of zero and expires once the PTAU timer reaches the received periodic registration timer value. Thus, duration of the idle mode may be increased, which further provides a sufficient time/duration for the UE 804 to receive an emergency call back from the CN 806b of the PLMN 802.

On the expiry of the PATU timer, the UE 804 performs the periodic registration procedure with the CN 806b to update the location information and receives the periodic registration timer value. The UE 804 may keep track of the periodic registration timer value by applying the received periodic registration timer value with the "Strictly Periodic Timer Registration Indication" and initiating the timer to operate. Thus, the UE 804 may continue to operate the PTAU as the periodic registration timer with the "Strictly Periodic Timer Registration Indication" till the initiation of the emergency service and to switch the behavior of the PTAU timer to the normal periodic registration timer/pre-release 16 behavior on the initiation of the emergency service. Thus, avoiding possible issues to the emergency services.

FIGS. 8A and 8B depict exemplary units/components of the wireless network 800, but it is to be understood that other embodiments are not limited thereon. In other embodiments, the wireless network 800 may include less or a greater number of units. Further, the labels or names of the units are used only for illustrative purpose and does not limit the scope of the embodiments herein. One or more units can be combined together to perform same or substantially similar function in the wireless network 800.

Figure 9A:
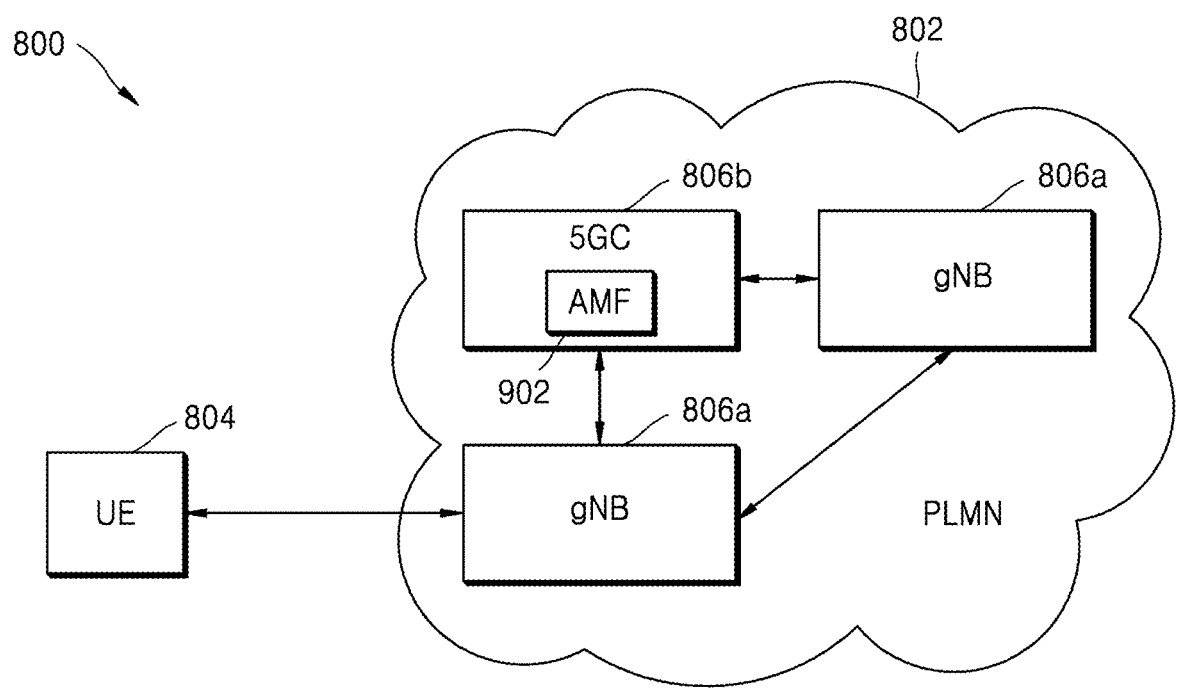
FIG. 9A depicts the wireless network handling the emergency services by switching the behavior of the PTAU timer to the normal periodic registration timer, wherein the wireless network includes a 5G system (5GS), according to an embodiment of the disclosure.

FIG. 9A depicts the wireless network 800 handling the emergency services by switching the behavior of the PTAU timer to the normal periodic registration timer, wherein the wireless network 800 includes a 5G system (5GS), according to an embodiment of the disclosure. Embodiments herein are further explained considering the PLMN 802 of the wireless network 800 including a 5G system (5GS) 806, as an example. As depicted in FIG. 9A, the 5GS 806 includes at least one gNB 806a, and a 5GC 806b. The 5GC network 806b may include an AMF 902 configured to support functions such as, but not limited to, termination of NAS signaling, NAS ciphering and integrity protection, registration management, connection management, mobility management, access authentication and authorization, security context management, and so on. The 5GC network 806b also includes an authentication server function (AUSF), a unified data management (UDM)/an authentication credential Repository (ARPF), a session management function (SMF), a user plane functionality (UPF), a policy control function, an application function, a network exposure function (NEF), a NF repository function (NRF), a network slice selection function (NSSF), and so on (not shown).

The UE 804 can be configured to connect to the 5GC network 806b through the gNB 806a. The UE 804 can also be configured to perform the registration management procedure with the AMF 902 of the CN 806b to register its reach ability/location information, mobility registered state, and so on.

Figure 9B:
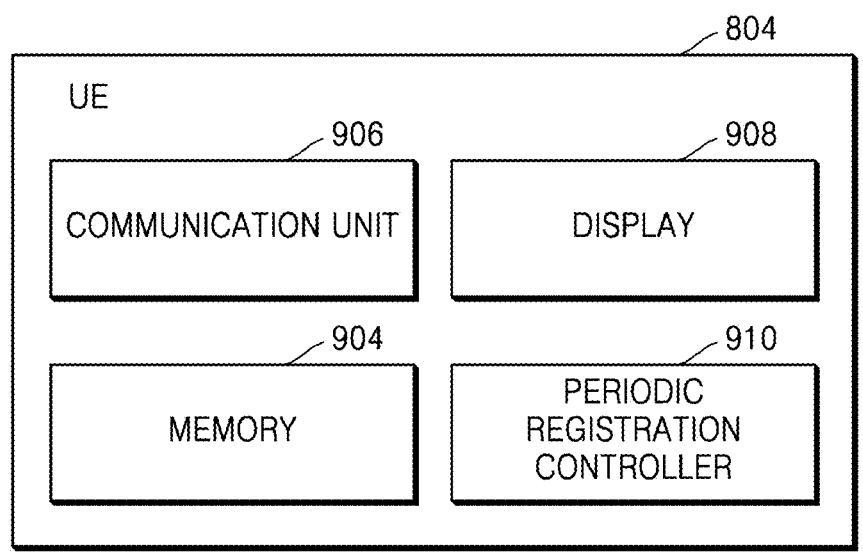
FIG. 9B depicts a UE configured to handle the emergency services by switching the behavior of the PTAU timer to the normal periodic registration timer, according to an embodiment of the disclosure.

As depicted in FIG. 9B, the UE 804 includes a memory 904, a communication interface 906, a display 908, and a periodic registration controller 910. The UE 804 can also include at least one transceiver, processing circuitry, a storage unit, a input/output (I/O) module, and so on (not shown).

The memory 904 can store at least one of the received periodic registration value, the PLMN_IDs, and so on. Examples of the memory 904 can be, but not limited to, NAND, embedded Multi Media Card (eMMC), Secure Digital (SD) cards, Universal Serial Bus (USB), Serial Advanced Technology Attachment (SATA), solid-state drive (SSD), and so on. Further, the memory 904 may include one or more computer-readable storage media. The memory 904 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 904 may, in some examples, be considered a non-transitory storage medium. The term "non-transitory" may indicate that the storage medium is not embodied in a carrier wave or a propagated signal. However, the term "non-transitory" should not be interpreted to mean that the memory 904 is non-movable. In certain examples, a non-transitory storage medium may store data that can, over time, change (e.g., in Random Access Memory (RAM) or cache).

The communication unit 906 can be configured to enable the UE 804 to connect with at least one of the at least one RAN 806a of the PLMN 802 over an interface. Examples of the interface can be at least one of a wired interface, a wireless interface (for example: an air interface, an Nu interface, or the like), a wireless fronthaul interface, a wired or wireless backhaul interface, or any structure supporting communications over a wired or wireless connection. The display 908 can be configured to enable the user to interact with the UE 804. The display 908 can also be configured to receive a request from the user for initiating the emergency services.

The periodic registration controller 910 can be at least one of a single processer, a plurality of processors, multiple homogeneous or heterogeneous cores, multiple Central Processing Units (CPUs) of different kinds, microcontrollers, special media, and other accelerators. The periodic registration controller 910 can be configured to perform the registration management procedure and the connection management procedure with the AMF 902 of the 5GC 806b.

The periodic registration controller 910 performs the registration management procedure to register/de-register with the AMF 902 of the CN 806b and to establish the UE context in AMF 902 of the CN 806b. The periodic registration controller 910 maintains a registered state or a registration attempting state or a registration update needed state (5GMM REGISTERED state or 5GMMREGISTERED.ATTEMPTING-REGISTRATION-UPDATE, or 5GMM-REGISTERED.UPDATE-NEEDED state) and a 5GMM-DEREGISTERED state for reflecting the registration status of the UE 804. In the 5GMM-DEREGISTERED state, the periodic registration controller 910 may not be registered with the AMF 902 of the CN 806b. In the 5GMM-REGISTERED state, the periodic registration controller 910 may perform the periodic registration procedure with the AMF 902 of the CN 806b to periodically update the location information/reach ability, mobility registration update, and so on with the AMF 902. The periodic registration controller 910 performs the connection management procedure for establishing and releasing the NAS signaling connection between the UE 804 and the AMF 902. The NAS signaling connection enables NAS signaling exchange between the UE 804 and the CN 806b. In the connection management, two connection management states a CM-5GMM-IDLE state and a 5GMM-CONNECTED state can be used to reflect the NAS signaling connection of the UE 804 with the AMF 902. In the CM-5GMM-IDLE state, the UE 804 may be in the registered state without having the NAS signaling connection established with the AMF 902. In the CM-5GMM-IDLE state, the periodic registration controller 910 of the UE 804 performs at least one of cell section, cell re-selection, PLMN selection, and so on. In the connected state, the periodic registration controller 910 of the UE 804 establishes the NAS signaling with the AMF 902.

The periodic registration controller 910 can be configured to perform the periodic registration procedure with the AMF 902 of the CN 806b and receives the periodic registration timer value from the AMF 902. In an embodiment, the periodic registration controller 910 can enable the UE 804 to operate in the MICO mode to perform the registration procedure.

The periodic registration controller 910 can be further configured to maintain the PTAU timer for tracking the received periodic registration timer value. The periodic registration controller 910 enables the PTAU timer to operate/behave as the periodic registration timer with the "Strictly Periodic Registration Timer Indication" by applying the received periodic registration timer value and the "Strictly Periodic Registration Timer Indication" to the PTAU timer. The PTAU timer may start from the value of 0 and expires on reaching the received periodic registration timer value. When the PTAU timer expires, the periodic registration controller 910 enables the UE 804 to perform the periodic registration procedure with the AMF 902 by entering into the 5GMM REGISTERED state for updating the location information/mobility registration update with the AMF 902. In an embodiment, the periodic registration controller 910 does not restart the PTAU timer if the UE 804 enters into the 5GMM-CONNECTED state for the data transmission or into the 5GMM-IDLE state on completion of the data transmission.

The periodic registration controller 910 can be further configured to switch the behavior of the PTAU timer from the periodic registration timer with the "Strictly Periodic Registration Timer Indication" into the normal periodic registration timer value when the UE 804 initiates the emergency service on receiving a request from the user for the emergency service. In an embodiment, the UE 804 may initiate the emergency service when the UE 804 is in the 5GMM-CONNECTED state. In an embodiment, the UE 804 may initiate the emergency service when the UE 804 is operating in the MICO mode.

When the emergency service is initiated in the 5GMM-CONNECTED state of the UE 804, the periodic registration controller 910 enables the UE 804 to perform the emergency attach procedure with the AMF 902 for establishing the emergency PDU session. During the emergency attach procedure, the periodic registration controller 910 of the UE 804 sends an emergency registration request to the AMF 902 through the associated RAN/gNB 806a by enabling the UE 804 to enter into an emergency registered state. On receiving the emergency registration request from the periodic registration controller 910 of the UE 804, the AMF 902 establishes the emergency PDU session between the UE 804 and the external data network without authenticating the UE 804. Once the emergency PDU session has been established for the UE 804, the periodic registration controller 910 stops operating the PTAU timer. The periodic registration controller 910 then applies the received periodic registration timer value without the "Strictly Periodic Registration Timer Indication" to the PTAU timer. Thus, the PTAU timer may switch its behavior from the periodic registration timer with the "Strictly Periodic Registration Timer Indication" into the normal periodic registration timer value.

When the emergency service is initiated in the MICO mode of the UE 804, the periodic registration controller 910 enables the UE 804 to disable the MICO mode. The periodic registration controller 910 also sends a disable request to the AMF 902 for disabling the registered MICO mode for the UE 804. On disabling the MICO mode, the periodic registration controller 910 performs the emergency attach procedure with the AMF 902 for establishing the emergency PDU session between the UE 804 and the external data network. Once the emergency PDU session has been established for the UE 804, the periodic registration controller 910 stops operating the PTAU timer, and the AMF 902 stops monitoring the periodic registration timer value allocated for the UE 804. Further, the periodic registration controller 910 of the UE 804 and the AMF 902 behaves as if no "Strictly Periodic Registration Timer Indication" was given to the UE 804 in the last registration attempt. The periodic registration controller 910 then switches the behavior of the PTAU timer by applying only the received periodic registration timer value (i.e. without the "Strictly Periodic Registration Timer Indication") to the PTAU timer. Thus, the PTAU timer may act as the normal periodic registration timer/pre-release 16 behavior.

On switching the behavior of the PTAU timer to the normal periodic registration timer, the periodic registration controller 910 enables the UE 804 to perform the emergency services over the established emergency PDU session. Once the emergency service is completed, the periodic registration controller 910 enables the UE 804 to enter into the 5GMM-IDLE state and starts the PTAU timer. The periodic registration controller 910 allows the UE 804 to remain in the 5GMM-IDLE state till the expiry of the PTAU timer. When the PTAU timer expires, the periodic registration controller 910 enables the UE 804 to detach locally from the AMF 902 of the CN 806*b* (according to 3GPP TS 24.501 subclause 5.3.7) due to its emergency registered state. The periodic registration controller 910 then performs the periodic registration procedure with the AMF 902 by entering into the 5GMM-REGISTERED state.

Figure 10:
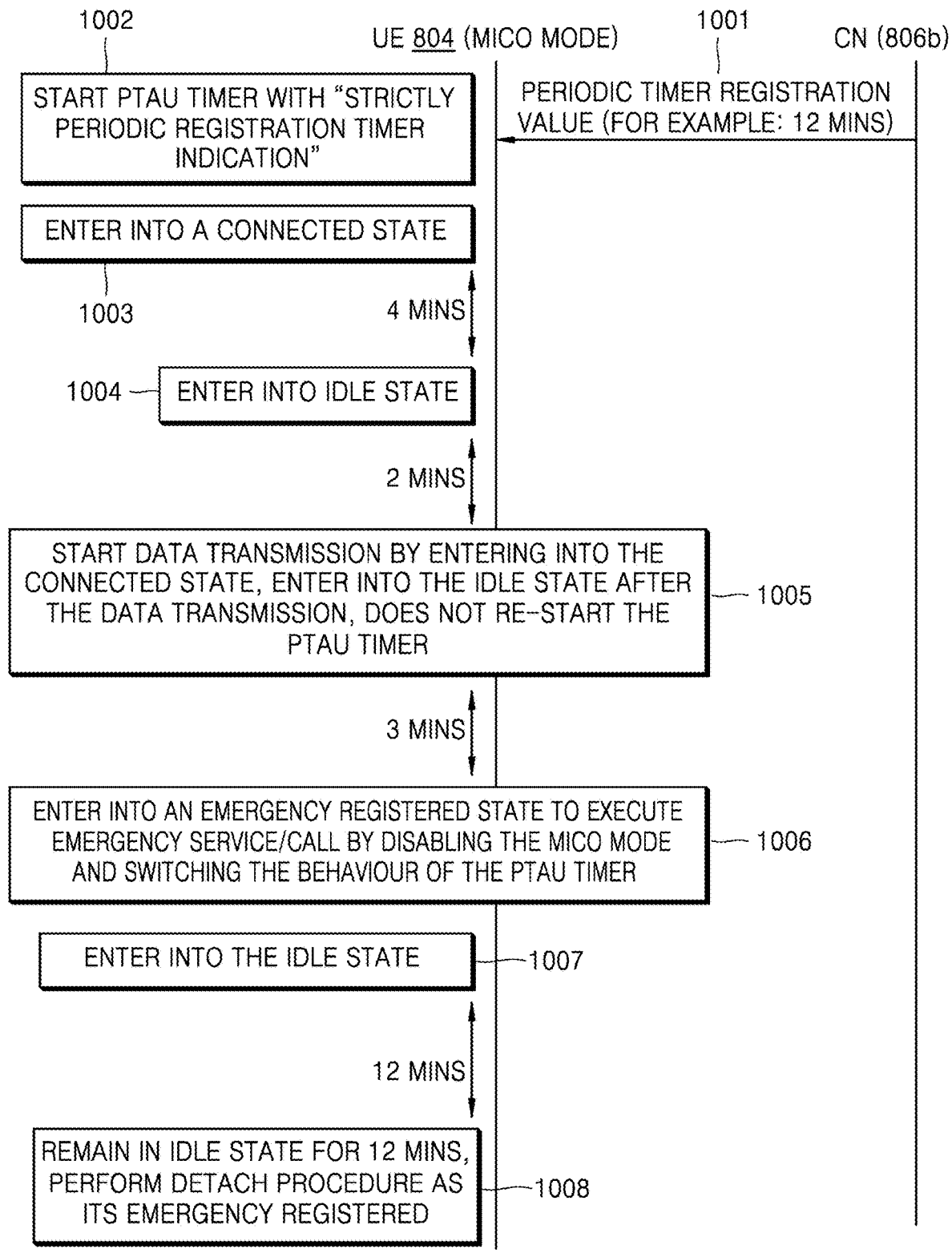
FIG. 10 is an example sequence diagram depicting the handling of the emergency service by enabling the PTAU timer supporting the "Strictly Periodic Registration Timer Indication" to act as the normal periodic registration timer, according to an embodiment of the disclosure.

FIG. 10 is an example sequence diagram depicting the handling of the emergency service by enabling the PTAU timer supporting the "Strictly Periodic Registration Timer Indication" to act as the normal periodic registration timer, according to an embodiment of the disclosure.

At step 1001, the UE 804 performs the periodic registration procedure with the CN 806*b* of the PLMN 802 during the registered state and receives the periodic registration timer value from the CN 806*b*. In an example herein, consider that the UE 804 may operate in the MICO mode, and the periodic registration timer value may be 12 minutes (mins). At step 1002, the UE 804 initiates the PTAU timer by applying the received periodic registration timer value with the "Strictly Periodic Registration Timer Indication". At step 1003, the UE 804 then enters into the connected state. After 4 mins of entering into the connected state, at step 1004, the UE 804 enters into the idle mode. After 2 mins of entering into the idle state, at step 1005, the UE 804 starts the data transmission to the CN 806*b* by entering into the connected state and enters into the idle state on completion of the data transmission. In an embodiment, the UE 804 does not re-start the PTAU timer, as the PTAU timer behaves as the periodic registration timer with the "Strictly Periodic Registration Timer Indication".

After 3 mins of entering into the idle mode, at step 1006, the UE 804 may receive a request from the user to initiate an emergency call. The UE 804 initiates the emergency call by disabling the MICO mode. The UE 804 further performs the emergency attach procedure with the CN 806*b* by entering into the emergency registered state to establish the emergency PDU session with the external data network. Once the emergency PDU session is established, the UE 804 stops the PTAU timer, and the CN 806*b* stops monitoring the periodic registration timer value sent to the UE 804. The UE 804 further switches the behavior of the PTAU timer from the periodic registration timer with the "Strictly Periodic Registration Timer Indication" to the periodic registration timer value.

On switching the behavior of the PTAU timer, the UE 804 performs the emergency call over the established PDU session. Once the emergency call is completed, at step 1007, the UE 804 enters into the idle mode. When the UE 804 enters into the idle state, the UE 804 starts the PTAU timer. As the behavior of the PTAU timer is switched, the PTAU timer starts from a value of 0 and expires on the timer reaching 12 mins. The UE 804 further remains in the idle state till the expiry of the PTAU timer, which provides a sufficient time (for example: 12 mins) for the UE 804 to receive the emergency call back from the CN 806*b*.

When the PTAU timer expires, at step 1008, the UE 804 locally detaches from the CN 806*b*, since the UE 804 has attached with the CN 806*b* for performing the emergency attach procedure. The UE 804 further performs the periodic registration procedure with the CN 806*b* by entering into the registration state.

Figure 11:
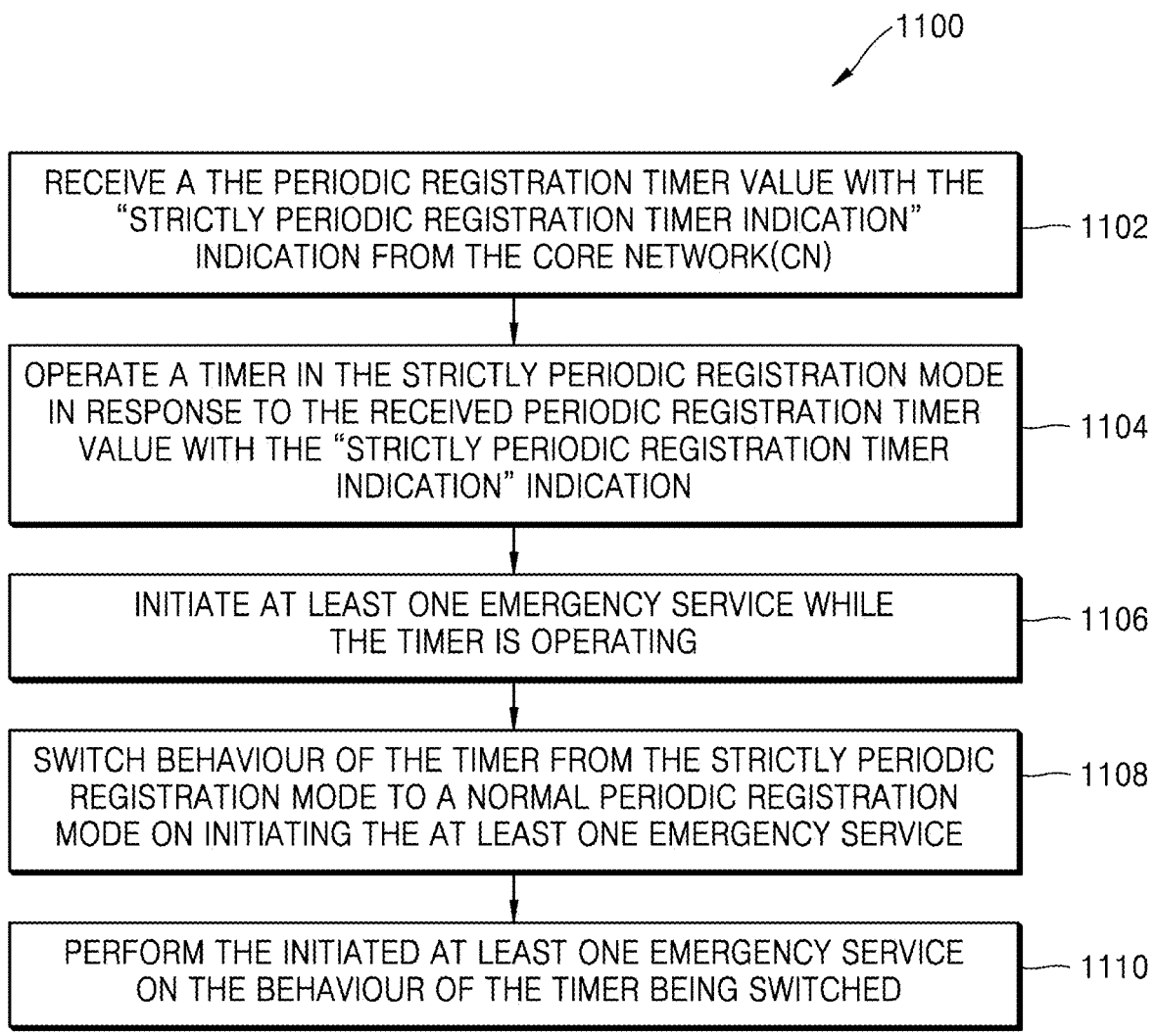
FIG. 11 is a flow diagram depicting a method for handling the emergency services by switching the behavior of the timer, according to an embodiment of the disclosure.

FIG. 11 is a flow diagram 1100 depicting a method for handling the emergency services by switching the behavior of the timer, according to an embodiment of the disclosure.

At step 1102, the method includes receiving, by the UE 804, the periodic registration timer value with the "Strictly Periodic Registration Timer Indication" indication from the CN 806*b*.

At step 1104, the method includes operating, by the UE 804, the timer in the strictly periodic registration mode in response to the received periodic registration timer value with the "Strictly Periodic Registration Timer Indication" indication.

At step 1106, the method includes initiating, by the UE 804, the at least one emergency service while the timer is operating. At step 1108, the method includes switching, by the UE 804, the behavior of the timer from the strictly periodic registration mode to a normal periodic registration mode on initiating the at least one emergency service.

At step 1110, the method includes performing, by the UE 804, the initiated at least one emergency service on the behavior of the timer being switched. The various actions in method 1100 may be performed in the order presented, in a different order or simultaneously. Further, in some embodiments, some actions listed in FIG. 11 may be omitted.

Embodiments herein further enable the UE 804 connected to at least one of the CN 806*b* of the PLMN 802 to handle priority services. Examples of the priority services can be, but not limited to, Mission Critical Services (MCS), Vehicle-to-everything (V2X) communication, Mobile Positioning System (MPS) network related services, Ultra-reliable low-latency communication (URLLC) services, and so on.

Figure 12A:
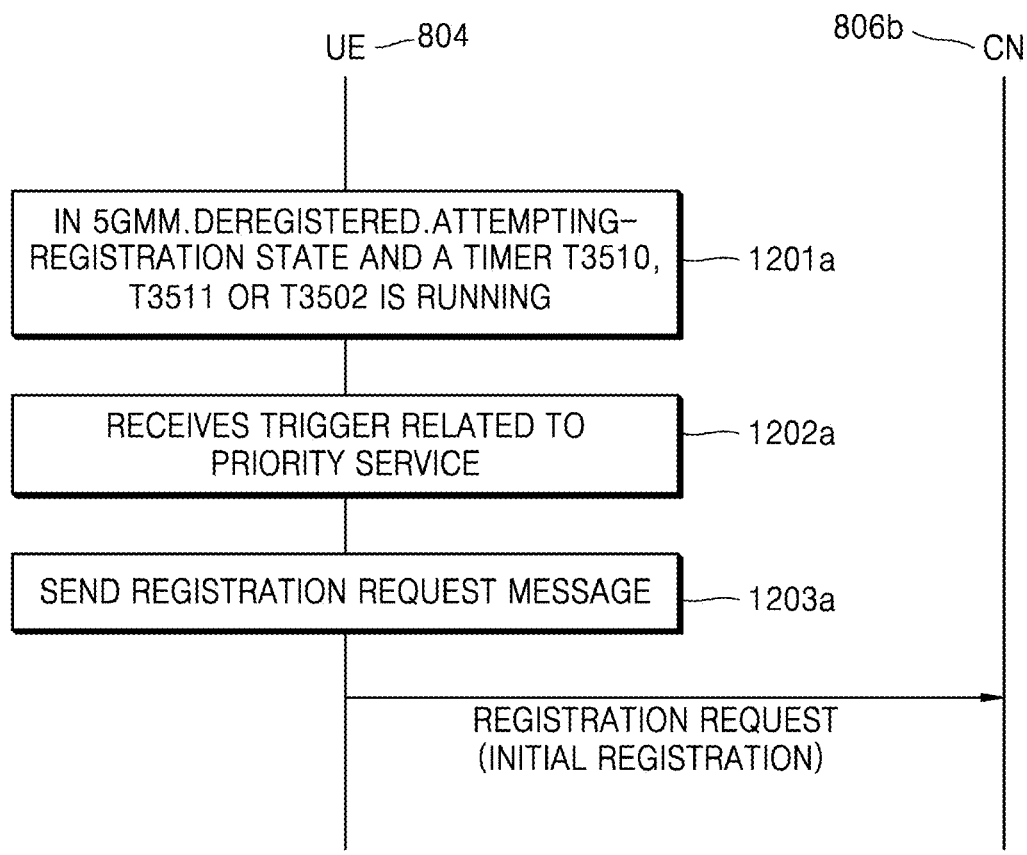
FIGS. 12A, 12B, and 12C are flow diagrams depicting handling of at least one priority service in the wireless network, according to an embodiment of the disclosure.
Figure 12B:
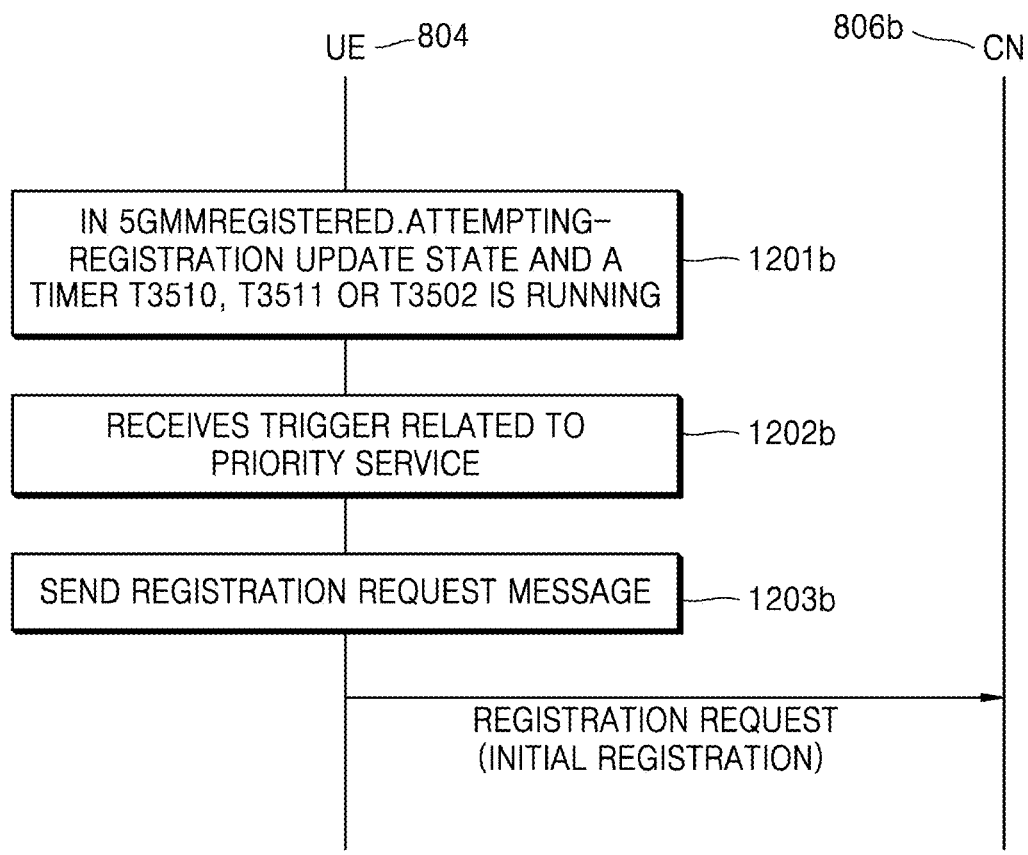
Figure 12C:
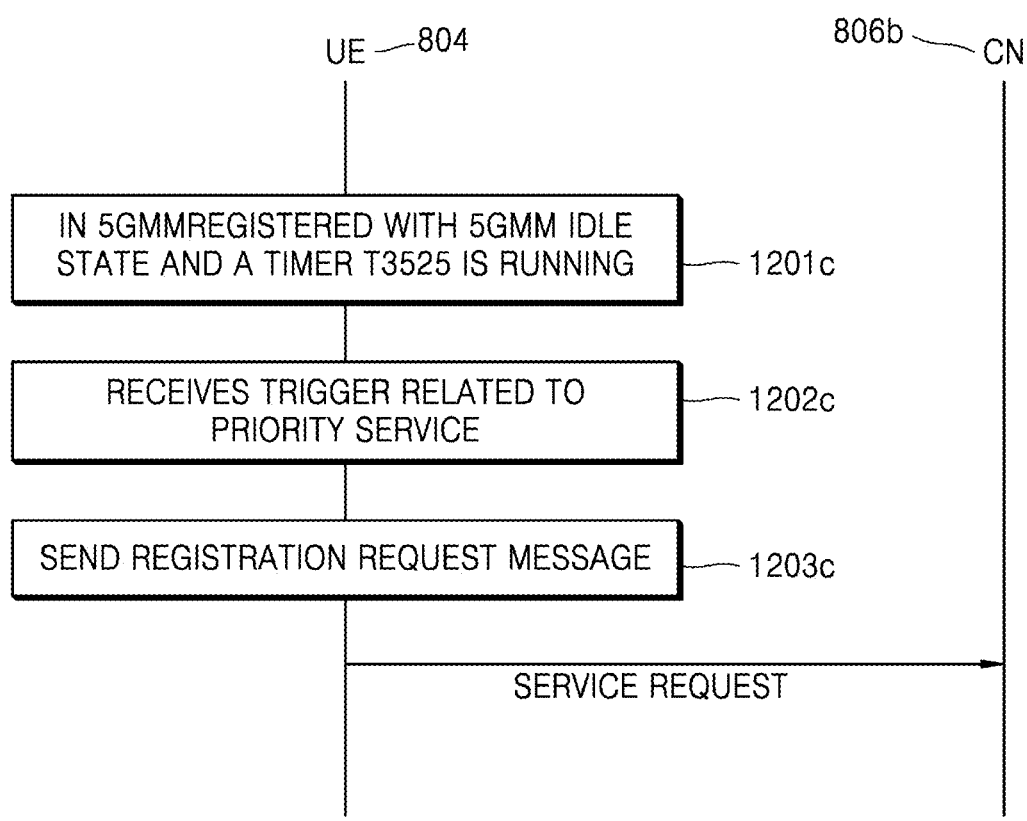

FIGS. 12A, 12B, and 12C are flow diagrams depicting the handling of the at least one priority service, according to an embodiment of the disclosure. The UE 804 executes 1201*a*-1203*a*, 1201*b*-1203*b*, 1201*c*-1203*c*, when the UE receives data or signaling related to at least one of the Mission Critical Service, the V2X communication, the MPS network related services, the URLLC services, and so on.

As depicted in FIG. 12A, at step 1201*a*, the UE 804 may be in a registration attempting state (for example: 5GMM-.DEREGISTERED.ATTEMPTING-REGISTRATION) state and the UE 804 executes/operates a timer (for example; at least one of a T3510 timer, a T3511 timer, a T3502 timer, or the like). At step 1202*a*, the UE 804 receives a request from an upper layer for the at least one priority service to establish signaling (for example: MCS signaling, V2 signaling, URLCC signaling, or the like) or user data. In such a case, at step 1203*a*, the UE 804 stops operating the timer and sends a registration request with an initial registration to the CN 806*b*.

As depicted in FIG. 12B, at step 1201*b*, the UE 804 may be in a registration attempting update state (for example: 5GMMREGISTERED.ATTEMPTING-REGISTRATION UPDATE state and the UE 804 operates the timer (for example; at least one of the T3510 timer, the T3511 timer, the T3502 timer, or the like). At step 1202*b*, the UE 804 the UE 804 receives a request from an upper layer for the at least one priority service to establish signaling or user data. In such a case, at step 1203*b*, the UE 804 stops operating the timer and sends the registration request with the initial registration to the CN 806*b*.

As depicted in FIG. 12C, at step 1201*c*, the UE 804 is in a register with an idle state (for example: 5GMMREGISTERED with 5GMM IDLE state) and the UE 804 executes/operates a T3525 timer. At step 1202*c*, the UE 804 receives a request from an upper layer for the at least one priority service to establish signaling or user data. In such a case, at step 1203*c*, the UE 804 transmits a service request message related to the at least one priority service to the CN 806*b*.

In an embodiment, the UE 804 may operate a back off timer, T3346. In such a case, if the UE receives a request from the normal services, the UE 804 does not transmit a NAS signaling message (for example: a registration message, a service message, or the like) related to the normal service to the CN 806*b*. In an embodiment, the UE 804 continues operating the back off timer and does not send the NAS signaling message to the CN 806*b*. In an embodiment, the UE 804 stops operating the back off timer and the NAS signaling to resume the allowed normal service.

In an embodiment, if the UE 804 receives the request for the at least one priority service to establish the signaling or the user while the back off timer is operating, the UE 804 transmits a NAS message (for example, a registration request or service request message) related to the at least one priority service to the CN 806*b*.

The embodiments disclosed herein can be implemented through at least one software program running on at least one hardware device and performing network management functions to control the elements. The elements shown in FIGS. 2A-12C can be at least one of a hardware device, or a combination of hardware device and software module.

Figure 13:
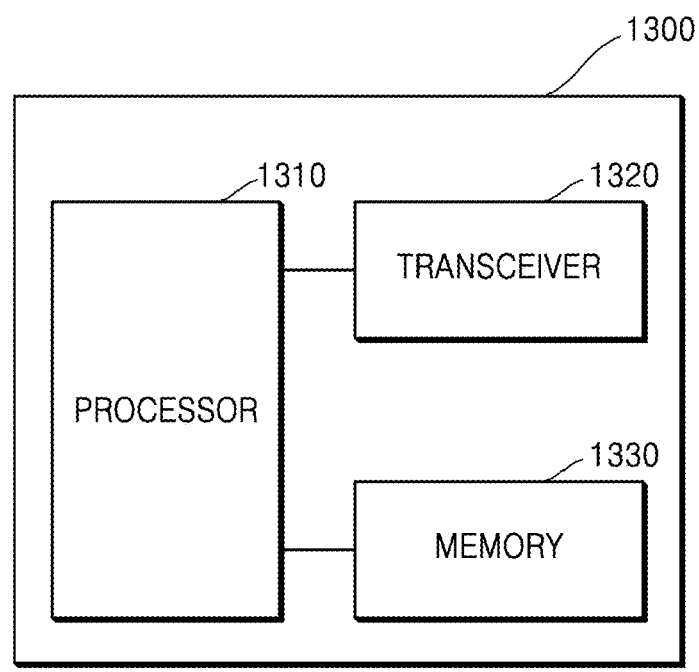
FIG. 13 schematically illustrates the base station according to an embodiment of the disclosure.

FIG. 13 schematically illustrates the base station according to an embodiment of the disclosure.

Referring to the FIG. 13, the Base station 1300 may include a processor 1310, a transceiver 1320 and a memory 1330. However, all of the illustrated components are not essential. The Base station 1300 may be implemented by more or less components than those illustrated in FIG. 13. In addition, the processor 1310 and the transceiver 1320 and the memory 1330 may be implemented as a single chip according to another embodiment.

The aforementioned components will now be described in detail.

The processor 1310 may include one or more processors or other processing devices that control the proposed function, process, and/or method. Operation of the Base station 1300 may be implemented by the processor 1310.

The transceiver 1320 may include a RF transmitter for up-converting and amplifying a transmitted signal, and a RF receiver for down-converting a frequency of a received signal. However, according to another embodiment, the transceiver 1320 may be implemented by more or less components than those illustrated in components.

The transceiver 1320 may be connected to the processor 1310 and transmit and/or receive a signal. The signal may include control information and data. In addition, the transceiver 1320 may receive the signal through a wireless channel and output the signal to the processor 1310. The transceiver 1320 may transmit a signal output from the processor 1310 through the wireless channel.

The memory 1330 may store the control information or the data included in a signal obtained by the Base station 1300. The memory 1330 may be connected to the processor 1310 and store at least one instruction or a protocol or a parameter for the proposed function, process, and/or method. The memory 1330 may include read-only memory (ROM) and/or random access memory (RAM) and/or hard disk and/or CD-ROM and/or DVD and/or other storage devices.

In an embodiment, the transceiver 1320 may transmit, to a User Equipment (UE), at least one signal for selecting a plurality of non-CAG cells available in a location of the UE, connect to the UE based on the at least one signal and provide at least one emergency service to the UE.

Figure 14:
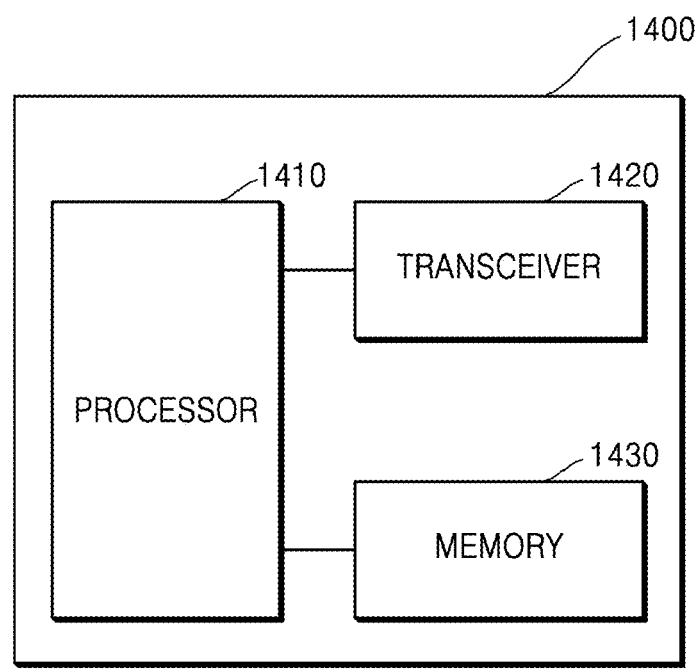
FIG. 14 schematically illustrates a user equipment (UE) according to an embodiment of the disclosure.

FIG. 14 schematically illustrates a user equipment (UE) according to an embodiment of the disclosure.

Referring to the FIG. 14, the UE 1400 may include a processor 1410, a transceiver 1420 and a memory 1430. However, all of the illustrated components are not essential. The UE 1400 may be implemented by more or less components than those illustrated in FIG. 14. In addition, the processor 1410 and the transceiver 1420 and the memory 1430 may be implemented as a single chip according to another embodiment.

The aforementioned components will now be described in detail.

The processor 1410 may include one or more processors or other processing devices that control the proposed function, process, and/or method. Operation of the UE 1400 may be implemented by the processor 1410.

The transceiver 1420 may include a RF transmitter for up-converting and amplifying a transmitted signal, and a RF receiver for down-converting a frequency of a received signal. However, according to another embodiment, the transceiver 1420 may be implemented by more or less components than those illustrated in components.

The transceiver 1420 may be connected to the processor 1410 and transmit and/or receive a signal. The signal may include control information and data. In addition, the transceiver 1420 may receive the signal through a wireless channel and output the signal to the processor 1410. The transceiver 1420 may transmit a signal output from the processor 1410 through the wireless channel.

The memory 1430 may store the control information or the data included in a signal obtained by the UE 1400. The memory 1430 may be connected to the processor 1410 and store at least one instruction or a protocol or a parameter for the proposed function, process, and/or method. The memory 1430 may include read-only memory (ROM) and/or random access memory (RAM) and/or hard disk and/or CD-ROM and/or DVD and/or other storage devices.

The embodiments disclosed herein describe methods and systems for handling emergency services in a wireless network. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) for handling at least one emergency service in a wireless network, the method comprising:

receiving, by the UE, a non-access stratum (NAS) message including an indication of whether the UE operates in a closed access group (CAG) only mode, wherein the CAG only mode indicates that the UE is only allowed to access a 5G system (5GS) via CAG cells;
identifying whether the UE is indicated to operate in the CAG only mode based on the NAS message and whether to initiate the at least one emergency service;
in response to initiating the at least one emergency service, performing, by the UE indicated to operate in the CAG only mode, registration to the 5GS via a non-CAG cell in a public land mobile network (PLMN);
establishing an emergency protocol data unit (PDU) session based on the registration; and
performing the at least one emergency service over the emergency PDU session on the non-CAG cell.

2. The method of claim 1, wherein the wireless network includes at least one non-public network (NPN) connected to the PLMN, wherein the at least one NPN is at least one CAG cell.

3. The method of claim 1, wherein each of the CAG cells provides at least one private service to the UE.

4. The method of claim 1, wherein the non-CAG cell is a public radio access network (RAN) connected to at least one core network (CN) of at least one radio access technology (RAT) present in the PLMN.

5. The method of claim 4, wherein each non-CAG cell provides at least one normal communication service and the at least one emergency service to the UE.

6. The method of claim 1, further comprising:
disabling the CAG only mode;
determining a plurality of non-CAG cells available in a location of the UE based on at least one signal broadcasted by the plurality of non-CAG cells; and
selecting the non-CAG cell from the plurality of non-CAG cells based on at least one factor associated with the at least one signal broadcasted by the plurality of non-CAG cells, wherein the at least one factor includes at least one of signal strength, and reference signal receive power.

7. The method of claim 6, wherein the UE selects the non-CAG cell for the at least one emergency service when the UE does not determine at least one CAG cell in the location, or when the at least one CAG cell connected to the UE does not support the at least one emergency service.

8. The method of claim 1, wherein performing the at least one emergency service includes:
camping on to the non-CAG cell in the PLMN with the emergency PDU session in case that the UE is only allowed to access 5GS via the CAG cells.

9. The method of claim 8, further comprises:
entering, by the UE, into an idle mode on completing the at least one emergency service;
remaining, by the UE, in the idle mode for a pre-defined period of time; and
enabling, by the UE, the CAG only mode on an expiry of the pre-defined period of time.

10. The method of claim 9, wherein the UE enables the CAG only mode by performing a registration update procedure with at least one core network (CN) of the PLMN.

11. The method of claim 1, further comprising:
establishing, by the UE, the emergency PDU session with at least one CAG cell for performing the at least one emergency service, when the UE is camped on the at least one CAG cell during the CAG only mode;

determining, by the UE, a connection loss with the camped at least one CAG cell, while performing the at least one emergency service through the camped at least one CAG cell; and
selecting, by the UE, the non-CAG cell for completing the at least one emergency service on determining the connection loss with the camped at least one CAG cell.

12. The method of claim 1, the method further comprising:
receiving, by the UE, a periodic registration timer value with a strictly periodic registration timer indication from a core network (CN);
operating, by the UE, a timer in a strictly periodic registration mode in response to the received periodic registration timer value with the strictly periodic registration timer indication;
initiating, by the UE, at least one emergency service while the timer is operating;
switching, by the UE, behavior of the timer from the strictly periodic registration mode to a normal periodic registration mode on initiating the at least one emergency service; and
performing, by the UE, the at least one emergency service on the behavior of the timer being switched.

13. A user equipment (UE) in a wireless network, the UE comprising:
a transceiver; and
a processor coupled to the transceiver and configured to:
receive, by the UE, a non-access stratum (NAS) message including an indication of whether the UE operates in a closed access group (CAG) only mode, wherein the CAG only mode indicates that the UE is only allowed to access 5G system (5GS) via CAG cells;
identify whether the UE is indicated to operate in the CAG only mode based on the NAS message and whether to initiate at least one emergency service;
in response to initiating the at least one emergency service, perform, by the UE indicated to operate in the CAG only mode, registration to the 5GS via a non-CAG cell in a public land mobile network (PLMN);
establish an emergency protocol data unit (PDU) session based on the registration; and
perform the at least one emergency service over the emergency PDU session on the non-CAG cell.

14. The UE of claim 13, wherein the wireless network includes at least one non-public network (NPN) connected to the PLMN, wherein the at least one NPN is at least one CAG cell.

15. The UE of claim 13, wherein each of the CAG cells provides at least one private service to the UE.

16. The UE of claim 13, wherein the non-CAG cell is a public radio access network (RAN) connected to at least one core network (CN) of at least one radio access technology (RAT) present in the PLMN.

17. The UE of claim 13, wherein the processor is further configured to:
disable the CAG only mode;
determine a plurality of non-CAG cells available in a location of the UE based on at least one signal broadcasted by the plurality of non-CAG cells; and
select the non-CAG cell from the plurality of non-CAG cells based on at least one factor associated with the at least one signal broadcasted by the plurality of non- CAG cells, wherein the at least one factor includes at least one of signal strength, and reference signal receive power.

18. The UE of claim 13, wherein the processor is further configured to:
camp on the non-CAG cell in the PLMN with the emergency PDU session in case that the UE is only allowed to access 5GS via the CAG cells.

19. The UE of claim 13, wherein the processor is further configured to:
enable the UE to establish the emergency PDU session with at least one CAG cell for performing the at least one emergency service, when the UE is camped on the at least one CAG cell during the CAG only mode;
determine a connection loss with the camped at least one CAG cell, while performing the at least one emergency service through the camped at least one CAG cell; and
select the non-CAG cell for completing the at least one emergency service on determining the connection loss with the camped at least one CAG cell.

20. A method performed by a base station for handling emergency services in a wireless network, the method comprising:
transmitting, to a user equipment (UE), a non-access stratum (NAS) message including an indication of a closed access group (CAG) only mode, wherein the CAG only mode indicates that the UE is only allowed to access 5G system (5GS) via CAG cells, and wherein whether the UE is indicated to operate in the CAG only mode based on the NAS message and whether to initiate at least one emergency service are identified by the UE;
establishing an emergency protocol data unit (PDU) session based on a registration, wherein in response to initiating the at least one emergency service, registration to the 5GS is performed by the UE indicated to operate in the CAG only mode via a non-CAG cell in a public land mobile network (PLMN); and
providing, to the UE, the at least one emergency service over the emergency PDU session on the non-CAG cell.

* * * * *